US012337502B2

(12) United States Patent
Hebert

(10) Patent No.: US 12,337,502 B2
(45) Date of Patent: Jun. 24, 2025

(54) DEMOLDING SYSTEM FOR A NON-LINEAR MOLDED PRODUCT

(71) Applicant: Louis Hebert, Saint-Urbain-Premier (CA)

(72) Inventor: Louis Hebert, Saint-Urbain-Premier (CA)

( * ) Notice: Subject to any disclaimer, the term of this patent is extended or adjusted under 35 U.S.C. 154(b) by 304 days.

(21) Appl. No.: 17/896,351

(22) Filed: Aug. 26, 2022

(65) Prior Publication Data

US 2022/0410430 A1 Dec. 29, 2022

Related U.S. Application Data

(63) Continuation of application No. 16/242,772, filed on Jan. 8, 2019, now Pat. No. 11,472,062.

(60) Provisional application No. 62/615,465, filed on Jan. 10, 2018.

(51) Int. Cl.

| | |
|---|---|
| ***B28B 1/14*** | (2006.01) |
| ***B28B 13/02*** | (2006.01) |
| ***B28B 13/06*** | (2006.01) |
| ***B29C 33/42*** | (2006.01) |

(52) U.S. Cl.

CPC ................ *B28B 13/02* (2013.01); *B28B 1/14* (2013.01); *B28B 13/026* (2013.01); *B28B 13/0295* (2013.01)

(58) Field of Classification Search

CPC .... B28B 7/06; B28B 7/08; B28B 1/14; B28B 13/02; B28B 13/026; B28B 13/0295; B28B 13/04; B28B 13/06; B28B 13/062; B29C 33/42; B29C 33/44

See application file for complete search history.

(56) References Cited

U.S. PATENT DOCUMENTS

2011/0148001 A1* 6/2011 Cress ...................... B29C 33/44 425/444
2012/0025422 A1* 2/2012 Manthei .................... B28B 7/08 264/313
2018/0111289 A1* 4/2018 Savorelli ............... B28B 13/062

* cited by examiner

*Primary Examiner* — Galen H Hauth
*Assistant Examiner* — Baileigh Kate Darnell
(74) *Attorney, Agent, or Firm* — Benoit&Cote Inc.; Mathieu Audet

(57) ABSTRACT

A demolding kit for concrete products to be molded and demolded. The demolding kit comprises a deformable mold having two rigid spines, a longitudinal mold volume extending transversally to the spines for molding a product, and a resting face opposed to the mold volume; and a bed having a non-matching shape relative to the resting face of the deformable mold. Clearance between the resting face and the bed about at least one of the spines is present when the resting face rests on the bed without exterior force applied thereon. The deformable mold is configured to have the resting face at least partially adopting the shape of the bed when exterior face is applied on the spines, thereby at least partially releasing the product from the mold volume.

20 Claims, 17 Drawing Sheets

DEMOLDING SYSTEM FOR A NON-LINEAR MOLDED PRODUCT

CROSS-REFERENCE TO RELATED APPLICATION

This application relates to and is a non-provisional application claiming priority under 35 U.S.C. § 119(a) from U.S. patent application Ser. No. 16/242,772, filed Jan. 8, 2019 under 35 U.S.C. § 111, entitled FILLER AND DEMOLDING SYSTEM FOR A NON-LINEAR MOLDED PRODUCT, which relates to and is a non-provisional application claiming priority under 35 U.S.C. § 119(e) from U.S. provisional patent application Ser. No. 62/615,465, filed Jan. 10, 2018, entitled FILLER AND DEMOLDING SYSTEM FOR A NON-LINEAR MOLDED PRODUCT, the specifications of which are hereby incorporated herein by reference in its entirety.

BACKGROUND

(a) Field

The subject matter disclosed generally relates to an apparatus for molding products. The subject matter disclosed generally relates to an apparatus for separating a molded product from a mold. More particularly, the subject matter relates to apparatuses for molding a molded product and separating the molded product from a mold made of a flexible material.

(b) Related Prior Art

A stone façade is often desirable in architectural works such as for an exterior entryway, an interior fireplace, or even the entire exterior of a home. However, obtaining such products from a quarry, transporting them to a work site, trimming them to the proper size, and installing them is expensive in terms of both materials and labor. In addition, the weight and bulk of natural stone can require foundation work, the addition of steel lintels, other extra support structures and the like.

To obtain a stone structure without the related costs and engineering considerations, a simulated stone facing can be manufactured and installed. Molds simulating stone of various sizes and types are created, and moldable material is poured into the molds to create a lighter weight, less expensive alternative to natural stone. Because the manufactured stone is relatively lightweight and has a controlled, relatively narrow depth, it can be applied to a building surface much more quickly and easily than is possible with natural stone. Also, the flat inner surface of this manufactured stone significantly eases installation. In addition, this manufactured stone may have the advantage of being uniform in size, strength, and coloration.

Molded articles (i.e., such as concrete articles for gardens, driveways, landscape designs, veneer products, roof tile products, building work and masonry products and the like) are typically molded at high speed in molding and demolding stations.

However, the production of manufactured stones, and particularly corner stones, does pose some manufacturing problems. Specifically, in the past, it has been the outcome of almost only manual labor to mold the products and to afterwards separate the stones from the mold in an efficient manner. Once the molded material (i.e., a wet moldable material, such as, without limitation, concrete, composite concrete and the like) is placed and allowed to at least partially set in the mold, removal of the stones from the mold requires manually intensive labor that is time consuming and expensive. Some mechanical processes and apparatus are also on the market for performing the separation of the molded product from the mold. However, the accuracy and/or performance of these processes and apparatus are often not optimal.

It should be noted that a corner stone is an example of a non-linear molded product. Other shapes for non-linear products, such as curved stone, are also contemplated by the present description.

There is therefore a need to provide an apparatus for improved and more efficient molding of molded products, and particularly manufactured corner stone products and the like, in a mold in a more efficient manner and that may be utilized for many mold sizes and configurations.

There is therefore a need for an improved apparatus for molding molded products in a mold made of a flexible material.

There is further therefore a need to provide an apparatus for improved and more efficient separating molded products, and particularly manufactured corner stone products and the like, from a mold in a more efficient manner and that may be utilized for many mold sizes and configurations.

There is therefore a need for an improved apparatus for separating molded products from a mold made of a flexible material.

SUMMARY

According to an embodiment, there is provided a filling apparatus for filling a mold volume of a mold with mold material, the filling apparatus comprising: a frame; and a shovel extending from the frame, the shovel forming a reservoir containing the mold material, wherein the shovel is movable: to open the reservoir to drop the mold material onto the mold to fill up the mold volume; and to scrape the surface of the mold and thereby to remove and to hold exceeding mold material.

According to an aspect, the filing apparatus further comprises a retention plate mounted to the frame, wherein the shovel is complementary to the retention plate to form the reservoir.

According to an aspect, during the scraping of the surface of the mold, the shovel pushes exceeding mold material over the retention plate until the shovel abuts the retention plate to form the reservoir.

According to an aspect, the filing apparatus further comprises a framework on which is mounted the frame, wherein the frame is movable relative to the framework to thereby change a distance between the mold and the frame.

According to an aspect, the shovel comprises an edge, wherein the retention plate comprises a face, and wherein the edge abuts the face to form the reservoir.

According to an aspect, the shovel comprises side plates, wherein the side plates hold the mold material transversally to a line of contact between the shovel and the retention plate.

According to an aspect, the retention plate is fixedly mounted to the frame.

According to an aspect, the shovel comprises a first arm rotatably mounted to the frame and a second arm rotatably mounted to the first arm, whereby a combined movement and rotation of the first arm and the second arm allows the shovel to adopt a plurality of angles relative to the frame.

According to an aspect, the mold comprises walls delimiting the mold volume, the walls having a first flat top surface and a second flat top surface, wherein the first flat top surface and the second flat top surface are not in a same plane and wherein the shovel, as a result of the combined movement and rotation of the first arm and the second arm is adapted to scrape the exceeding mold material about the walls.

According to an aspect, the filing apparatus further comprises jacks connected to the first arm and the second arm to impart the movement and rotation of the first arm and the second arm.

According to an aspect, the mold comprises another mold volume and a central spine, wherein the mold volume and the other mold volume are located on opposite sides of the central spine, and wherein the filling apparatus comprises another reservoir operating concurrently with the reservoir, with the reservoir operating in relation with the mold volume and the other reservoir operating in relation with the other mold volume.

According to an aspect, the filing apparatus further comprises another shovel forming the other reservoir, wherein the shovels are disposed in a mirror-like fashion.

According to an embodiment, there is provided a filling apparatus for filling a mold volume of a mold with mold material, the filling apparatus comprising: a frame; a pair of complementary enclosure components mounted to the frame, wherein the enclosure components form together a reservoir for containing the mold material; wherein the enclosure components are movable relatively to each other between a hold position and a release position: wherein, in the release position, the enclosure components are away from each other, whereby the reservoir is not formed; and wherein, in the hold position, the enclosure components are abutting each other, whereby the reservoir is formed and holds the mold material therein; and wherein the enclosure components are movable between a mold scraping position and a mold distant position: wherein, in the mold filling position, the enclosure components are above the mold, and wherein, when enclosure components move between the hold position and the release position, the enclosure components open the reservoir for the mold material to fall onto the mold to fill up the mold volume; and wherein, in the mold scraping position, the enclosure components abut the mold, and wherein, when the enclosure components move between the hold position and the release position, one of the enclosure components is scraping exceeding mold material toward the other enclosure component, whereby the exceeding mold material is scraped toward the reservoir.

According to an aspect, the filing apparatus further comprises a framework on which is mounted the frame, wherein the frame is movable relative to the framework to thereby change a distance between the mold and the frame.

According to an aspect, first one of the enclosure components comprises an edge and second one of the enclosure components comprises a face, and wherein the edge abuts the face to form the reservoir.

According to an aspect, at least one of the enclosure components comprise side plates, wherein the side plates hold the mold material transversally to a line of contact between the enclosure components.

According to an aspect, a first one of the enclosure components is fixedly mounted to the frame.

According to an aspect, a second one of the enclosure components comprises a first arm rotatably mounted to the frame, a second arm rotatably mounted to the first arm, whereby a combined movement and rotation of the first arm and the second arm allows the enclosure component to adopt a plurality of angles relative to the frame.

According to an aspect, the mold comprises walls delimiting the mold volume, the walls having a first flat top surface and a second flat top surface, wherein the first flat top surface and the second flat top surface are not in a same plane and wherein the shovel is adapted to scrape the exceeding mold material about the walls.

According to an aspect, the mold comprises another mold volume and a spine, wherein the mold volume and the other mold volume are located on opposite side of the spine, and wherein the filling apparatus comprises another the reservoir operating concurrently, with the reservoir operating in relation with the mold volume and the other reservoir operating in relation with the other mold volume.

According to an embodiment, there is provided a demolding apparatus for demolding molded products from a deformable mold, wherein the mold comprises a pair of outer spines, each one of the outer spines located at respective one of two outer lateral edges of the mold, the demolding apparatus comprising: a frame; jaws extending from the frame for grabbing the mold by the spines; and a bed having a shape; whereby when movement is imparted to bring the mold and the bed toward each other, the jaws hold the lateral edges of the mold while pressure is applied to the mold between the two lateral edges to force the mold to marry the shape of the bed and thus at least partially releasing the molded products from the mold.

According to an aspect, the demolding apparatus further comprises a lifting assembly extending from the frame and to which the jaws are mounted, the lifting assembly for imparting vertical and horizontal movement to the mold.

According to an aspect, the bed is immobile while the lifting assembly lowers the mold held by the jaws toward the bed for demoulding.

According to an aspect, the mold rests on a carrier and the lifting assembly is adapted to lift the mold from the carrier and translate it above the bed.

According to an aspect, the shape of the bed comprises a convex portion.

According to an aspect, the mold further comprises handling components extending from the outer spines, and wherein the jaws comprise contacting faces contacting the handling components and forcing displacement of the handling components upon the jaws being moved.

According to an aspect, the mold further comprises handling components extending from the outer pines, wherein the jaws comprise slots comprising contacting faces, and wherein the contacting faces of the jaws contact the handling components to displace the outer spines of the mold.

According to an aspect, the jaws are rotatably movable, and wherein by rotating the jaws, the handling components enter the slots.

According to an aspect, the jaws are adapted to move according to: a) first degree of freedom between a free position away from the mold, and a holding position contacting the mold, and b) a second degree of freedom between a lifted position distant from the bed and a pressing position closer to the bed, and wherein when the jaws are in a holding position and a pressing position, at least one of the spines is displaced toward the bed.

According to an aspect, the mold rests on a carrier and wherein the jaws are adapted to move according to: c) a third degree of freedom between a carrier position about the carrier and away from the bed, and bed position about the bed and away from the carrier, wherein the jaws are adapted to grab, lift and move the mold away from the carrier toward the bed.

According to an aspect, the demolding apparatus further comprises a head structure movably mounted to the frame and lifting assembly for raising and lowering the head structure relative to the frame, wherein the head structure is adapted to move according to the second degree of freedom and the third degree of freedom.

According to an aspect, the jaws comprise a mounting end and a handling end distant from the mounting end, wherein the jaws are mounted to the frame at the mounting end and contacting the mold with the handling end.

According to an aspect, the bed has a longitudinal direction, the demolding apparatus further comprising a conveyor parallel to the longitudinal direction of the bed for conveying the molded product once removed from the mold.

According to an embodiment, there is provided a demolding apparatus for demolding a molded product from a deformable mold, wherein the mold comprises a resting face having a transversal mold shape and a pair of transversally distant longitudinal spines, the demolding apparatus comprising: a frame; a bed comprising a bed face having a transversal bed shape, wherein, when the resting face of the mold lays down freely over the bed face, free space remains between the resting face and the bed face about at least one of the longitudinal spines; and jaws movably mounted to the frame for forcing displacement of at least one of the spines toward the bed, thereby forcing the resting face of the deformable mold to marry the bed face and thus to at least partially release the molded product from the deformable mold.

According to an aspect, the mold further comprises handling components extending from the spines, and wherein the jaws comprise contacting faces contacting the handling components and forcing displacement of the handling components upon the jaws being moved.

According to an aspect, the jaws comprise slots comprising the contacting faces, wherein the jaws are rotatably movable, and wherein, by rotating the jaws, the slots surround the handling components.

According to an aspect, the bed face has an arched shape having an apex, and wherein one of the spines is adapted to be aligned with the apex.

According to an aspect, the jaws are adapted to move according to: a) a first degree of freedom between a free position away from the mold, and a holding position contacting the mold, and b) a second degree of freedom between a lifted position distant from the bed and a pressing position closer to the bed, and wherein when the jaws are in a holding position and a pressing position, at least one of the spines is displaced toward the bed.

According to an aspect, the jaws comprise a mounting end and a handling end distant from the mounting end, wherein the jaws are mounted to the frame at the mounting end and contacting the mold with the handling end.

According to an aspect, the demolding apparatus further comprises: a head structure mounted to the frame, and a lifting assembly for raising and lowering the head structure and therefore with respect to the second degree of freedom.

According to an aspect, the demolding apparatus further comprises: a head structure movably mounted to the frame, and crane component for moving the head structure and therefore having the jaws are adapted to move according to a third degree of freedom between a bed position about the bed and a carrier position away from the bed.

According to an embodiment, there is provided a method for filling a mold volume of a mold with mold material, comprising: positioning a mold comprising an apex and the reservoir in an aligned configuration with the reservoir above the mold; opening the reservoir for releasing the mold material enclosed in the reservoir on the mold to fill up a mold volume; lowering complementary enclosure components abutting about a first extremity and a second extremity of mold volume; moving a first one of the complementary enclosure components toward the other so as to scrape the mold material in-between from the top of the mold toward the other up to the complementary enclosure components contacting and closing the reservoir; and lifting the reservoir up in a mold hovering position.

According to an aspect, the method further comprises having the mold forced to vibrate to have the mold material taking place in the mold volume.

According to an aspect, the method further comprises moving the mold and the filling apparatus away from each other, freeing the filling apparatus to fill another mold with the scraped mold material.

According to an embodiment, there is provided a method for demolding a molded product from a deformable mold, comprising: placing the deformable mold comprising two spines and handling components relative to the spines on a bed wherein at least part of the deformable mold in not supported by the bed; forcing deformation of the mold by applying pressure on the handling components such that the spins are moved towards the bed, and thereby at least partially releasing the molded product from the mold.

According to an aspect, the handling components extend from the spines of the mold, the method further comprising: moving jaws comprising top contacting faces toward the handling components for the top contacting faces to be above the handling components; and moving the jaws toward the bed for the top contacting faces to force displacement of part a spine through displacement of at least part of the handling components toward the bed.

According to an aspect, the handling components extend from the spines of the mold, the method further comprising: moving jaws comprising bottom contacting faces toward the handling components for the bottom contacting faces to be under the handling components; and moving up the jaws away from the bed for the bottom contacting faces to contact the handling components and thereby have the jaws lifting the mold away from the bed.

According to an embodiment, there is provided a demolding apparatus for demolding a molded product out of a deformable mold, wherein the mold comprises a resting face having a transversal mold shape and a pair of transversally distant longitudinal spines. The demolding apparatus comprises a frame, a bed and jaws. The bed comprises a bed face having a transversal bed shape, wherein, when the resting face of the mold lays down freely over the bed face, free space remains between the resting face and the bed face about at least one of the longitudinal spines. The jaws are movably mounted to the frame for forcing displacement of at least one of the spines toward the bed, thereby forcing the resting face of the deformable mold to marry the bed face and thus to at least partially release the molded product from the deformable mold.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The embodiments will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illustrate the exemplary realizations and does not pose a limitation on the scope of the embodiments. No language in the specification should be construed as indicating any unclaimed element as essential to the practice of the embodiments.

In the following description, it is understood that terms such as "first", "second", "top", "bottom", "above", "below", and the like, are words of convenience and are not to be construed as limiting terms unless explicitly stated otherwise, for physical or environmental reasons, or clear from the text.

Figure 23A:
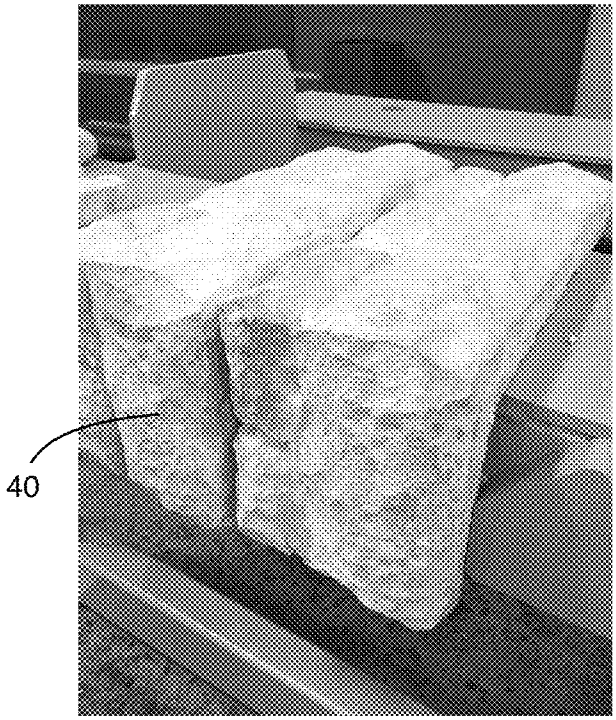
FIGS. 23A-B are pictures showing manufactured corner stones once removed from the conveyor.
Figure 23B:
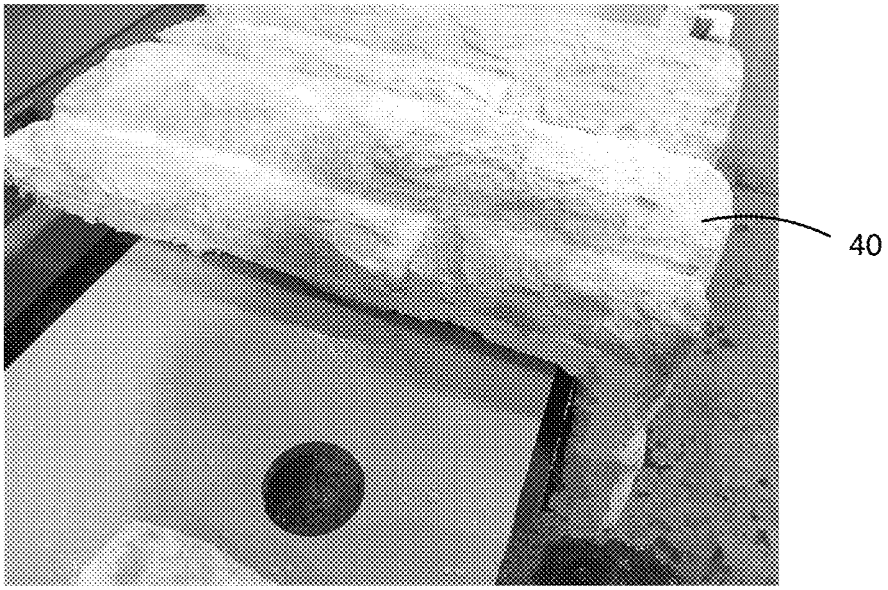

In embodiments, there are disclosed apparatuses and methods for molding molded products from a mold made of a flexible material. According to embodiments, the molded products are manufactured non-linear molded products (e.g., corner stones 40, which will be used from now on in the present description, FIGS. 23A-B).

In further embodiments, there are disclosed apparatuses and methods for separating molded products from a mold made of a flexible material. According to embodiments, the molded products are manufactured corner stones.

Embodiments further disclose a mold made of flexible material for the molding and demolding of molded products. According to embodiments, the molded products molded and demolded from the mold are manufactured corner stones.

Figure 1:
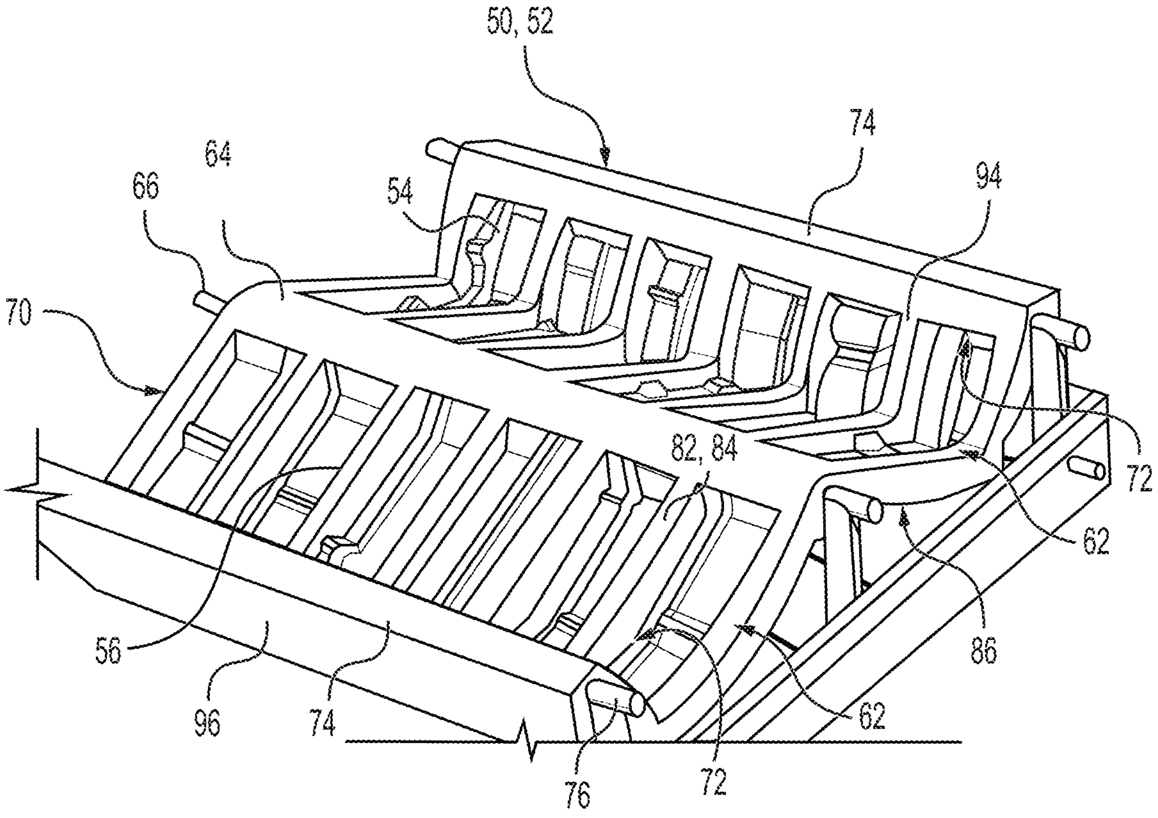
FIG. 1 is picture showing a perspective view of a mold for manufacturing corner stones in accordance with an embodiment.

Referring now to the drawings, and more particularly to FIGS. 2-9, there is shown a filling apparatus 100 for filling mold material and molding a molded product (e.g., corner stones 40 of FIGS. 23A-B) or a plurality of molded products in mold volumes 54 in a mold 50 (FIG. 1). The molded product may be made of a molded material, a wet moldable material, such as, without limitation, a concrete material, a composite concrete material and the like. The molded product may be a manufactured stone of variable dimensions. The molded product may more precisely be a manufactured corner stone product, although it is understood that the molded product formed in the mold 50 may have any other desired configuration.

Referring now to FIG. 1, the mold 50 comprises a mold body 52 and may be adapted to form various sizes of molded product. The mold 50 includes a pair of first sloped bodies 62 joined about a central spine 64. Each of the first sloped body 62 extend from the central spine 64 to a second sloped body 72. From the central spine 64, the first sloped bodies 62 extend downwardly, with the second sloped bodies 72 extending upwardly from the first sloped bodies 62, each one of the pairs of first sloped body 62 and second sloped body 72 generally defining a V-shaped molding face 70. The V-shaped molding face 70 comprise a plurality of upwardly open molding cavities extending continuously from the first sloped body 62 to the second sloped body 72 to form a corner-shaped mold volume 54. Between the mold volumes

54, beside the first and last mold volumes 54, as at the extremities of the mold volumes 54, are walls 56 having a top wall face 82 defining a substantially flat first top surface 84 and a substantially flat second top surface 94 relative to each one of the first sloped bodies 62 and the second sloped bodies 72. Opposed to the first top surface 84 and second top surface 94 are first resting face 86 and second resting face 96. The mold volume 54 can be said to be depending from the surface 84, 94 of the mold 50.

At the extremity of each of the second slope bodies 72 are outer spines 74 parallel to the central spine 64. Pins 66 and 76 parallel to the central spine 64 further extend beyond the mold 50 from the central spine 64 and the outer spines 74. According to the foregoing embodiment, there is a mold volume 54 on one side of the central spine 64 and another mold volume on the other (opposite) side of the central spine 64.

According to an embodiment (not shown), there is no central spine. There are only outer spines and a mold volume therebetween.

The mold body 52 is formed of a substantially flexible (and resilient) material capable of being flexed and deformed, for example from application of diverging forces on the outer spines 74 relative to the central spine 64, and returning to its original shape, for example once the diverging force is released therefrom.

In order to set relative coordinates, the mold 50 comprises side by side mold volumes 54 in the longitudinal direction parallel to the central spine 64, the outer spines 74 and the pins 66 and 76. The spines 64 and 74 are thus transversally distant from each other.

Referring back to the FIGS. 2-9, the process of filling the mold 50 with mold material 90 is illustrated through side views of the filling apparatus 100 and the mold 50.

Figure 2:
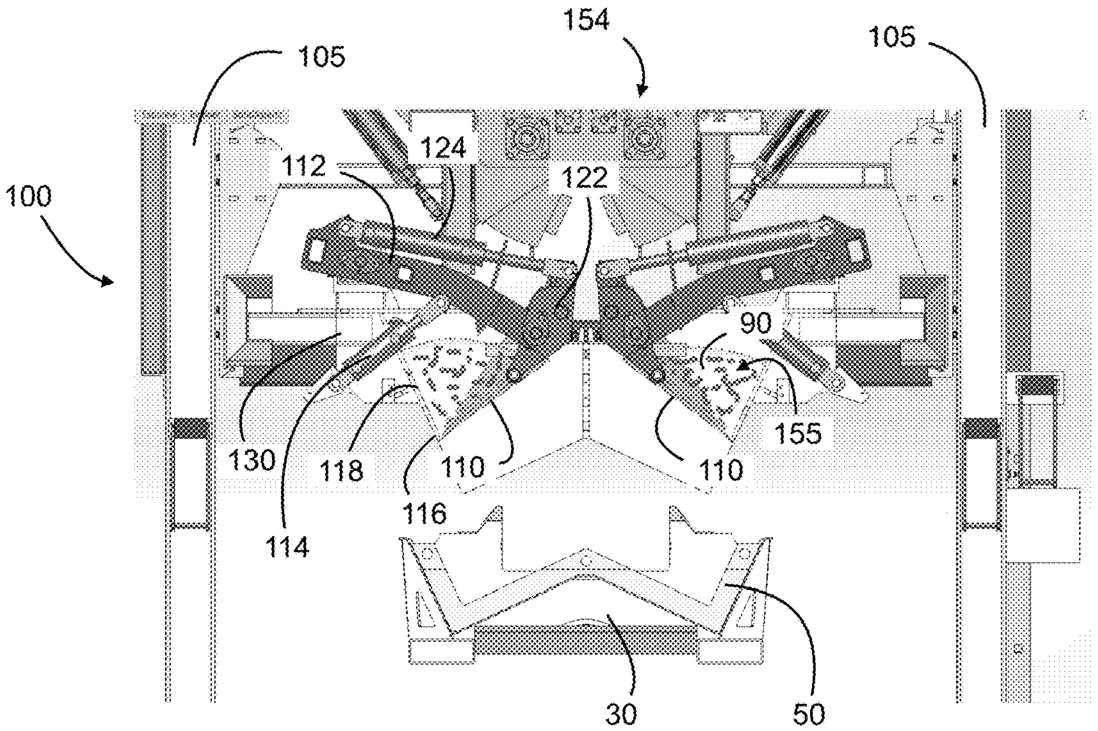
FIG. 2 is schematic diagram showing a side view of a filling apparatus for manufactured corner stones at a first step of filling a mold with mold material in accordance with an embodiment.

Referring to FIG. 2, the mold 50 rests on a carrier 30 having a similar shape as the first and second resting faces 86 and 96 of the mold 50, the carrier 30 comprising holding structures for holding the mold 50 and thus maintaining the shape of the mold 50 during the filling process, including resisting to pressure applied by the filling apparatus 100. During the filling process, the carrier 30 is mounted on a vibration table 25.

The filling apparatus 100 comprises a framework 105 on which in movably mounted a frame 130, the frame 130 being movable vertically relative to the framework 105. The filling apparatus 100 further comprises a pair of shovels 110 having an attacking edge 116. The shovels 110 are rotatably mounted to a frame 130 which can be lowered and raised. The filling apparatus 100 comprises for each shovel 110 a first arm 112 rotatably mounted to the frame 130, and a second arm 122 rotatably mounted to the first arm 112. The shovel 110 is fixedly mounted to the second arm 122, extending downward so that a reservoir 155 is located under the first arm 112.

A first jack 114, mounted at one extremity to the frame 130 and at the other extremity to the first arm 112 distant from the shovel 110, drives the position of the first arm 112. A second jack 124, mounted at one extremity to the first arm 112 and at its other extremity to the second arm 122 distant from the shovel 110, drives the position of the second arm 122 relative to the first arm 112. It is understood that a combined movement and rotation of the first arm 112 and the second arm 122 allows the shovel 110 to adopt a plurality of angles relative to the frame 130. A retention plate 118 defines a retention face 119 complementing the shovel 110 to define the reservoir 155 for containing mold material 90 and in consequence preventing the mold material 90 to exit the reservoir 155 unintentionally.

Accordingly, complementary shovel 110 and retention plate 118 form a pair of complementary enclosure components defining a reservoir 155 for containing mold material 90. The complementary enclosure components are movable relatively to each other between a hold position and a release position to have the reservoir 155 either holding or releasing its content. In the release position, the complementary enclosure components are away from each other, whereby having the reservoir open (i.e., not formed). In the hold position, the complementary enclosure components abut each other, whereby having the reservoir formed and holding the mold material therein.

At a first step illustrated on FIG. 2, the frame 130 is raised and mold material 90 is present in the reservoir 155. The reservoir 155 is filled with mold material 90 which is provided from the main tank 154 located above the reservoir 155 (see down arrows in FIG. 2). The shovels 110 have their attacking edge 116 raised and pressing against their complementary retention plate 118 to hold the mold material 90 in the reservoirs 155 above the mold 50 ready for use.

Figure 3:
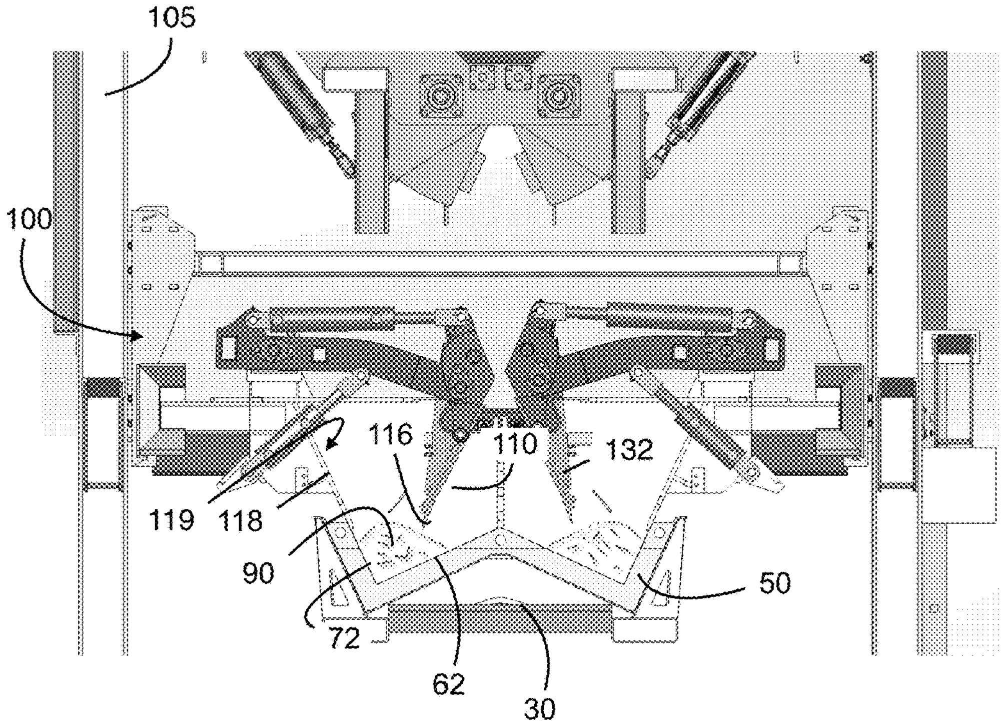
FIGS. 3-9 are schematic diagrams showing side views of the filling apparatus of FIG. 2 at further steps of filling a mold with mold material in accordance with an embodiment.

Afterwards, as shown in FIG. 3, the frame 130 is lowered to have the retention plates 118 pressed against the second sloped bodies 72, extending the material containment capacity of the mold 50. Further, the shovels 110 are rotated so that their attacking edges 116 move away from the retention plates 118, opening the reservoirs 155. The mold material 90 upon opening of the reservoirs 155 falls on the mold 50 and fills the mold volumes 54.

One must note that the general V shape of the mold 50 and the retention plates 118 pressed against the mold 50 allow containment of more material then what is needing to fill up the mold volumes 54.

Figure 4:
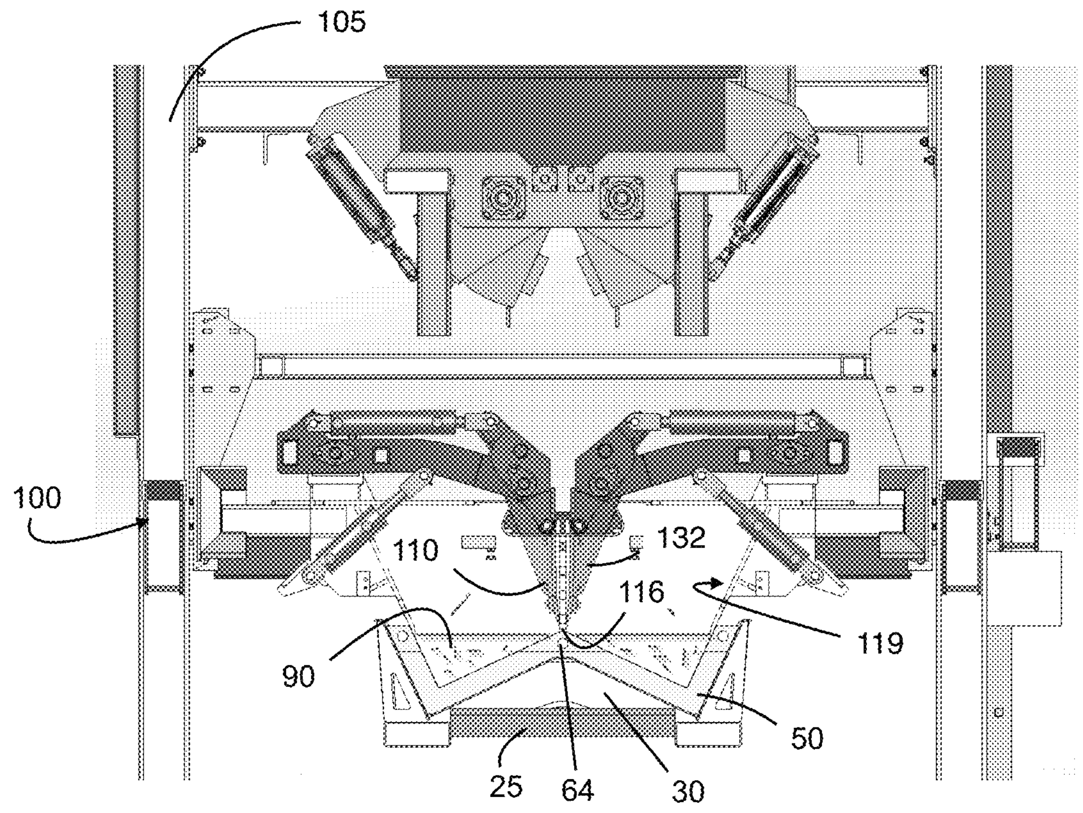

FIG. 4 shows the mold material 90 setting in location in the mold 50, comprising filling the mold volumes 54 upon action of the vibration table 25 mounted thereon. FIG. 4 further shows the rotation of the shovels 110 completing their course in a central position, substantially back to back, having their attacking edges 116 above the central spine 64 of the mold 50.

Figure 5:
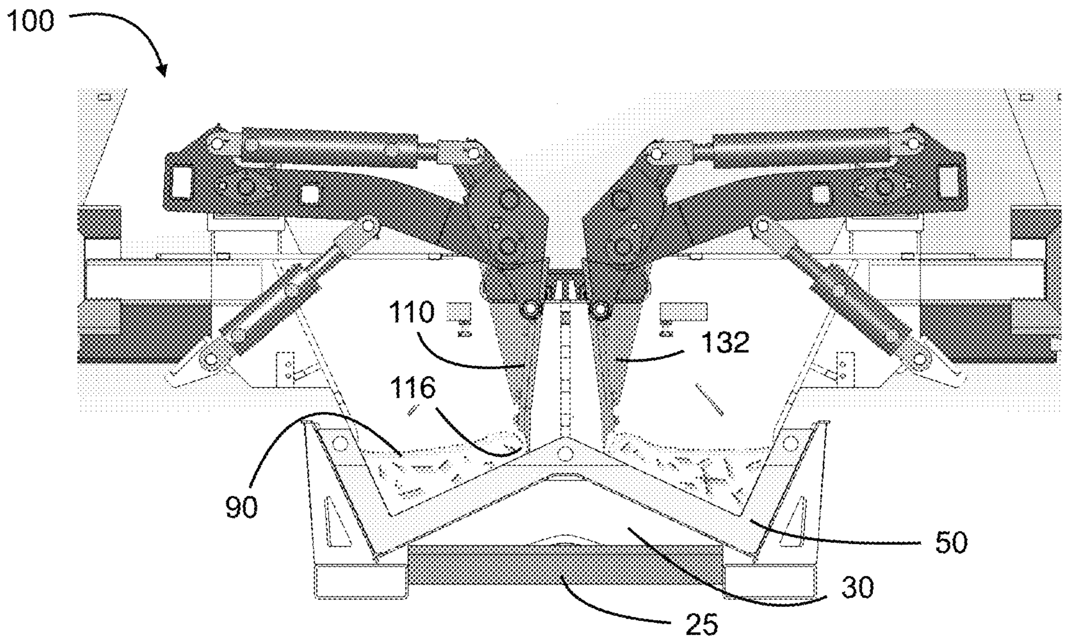

FIG. 5 shows, once the vibration table 25 has stopped operating, the shovels 110, lowered close to and about abutting the surfaces 84, 94 of the mold 50, having started to move along the top surfaces 84, 94 to scrape or to remove the exceeding mold material 90 from the mold 50. In order to do so, the attacking edge 116 of each of the shovels 110 follows their corresponding first top surface 84, 94 towards the outer spines 74.

According to an embodiment, the carrier 30 comprises safeguards (not shown) located beyond the mold 50 and having a shape corresponding to the shape defined by the first top surfaces 84 and the second top surfaces 94. The shovels 110 comprises guides (not shown) extending to the location of the safeguards that prevent the shovels 110 when scraping the exceeding mold material 90 to be lowered to a level where the attacking edge 116 would attack the mold 50, risking premature wear of the mold 50 or even to break the mold 50.

Figure 6:
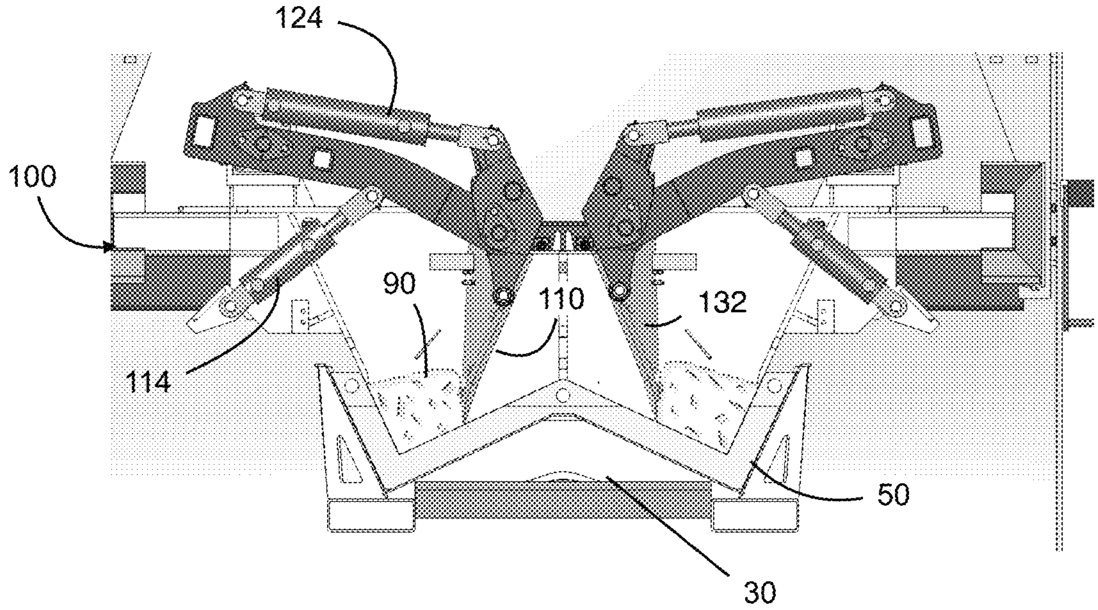

FIG. 6 shows the shovels 110 moved further in their scraping course. The first jack 114 and the second jack 124 drive the scraping course of the shovels 110 by controlling elevation and rotation of the shovels 110 such that the attacking edges 116 follow the shape of the mold 50/safeguards.

Figure 7:
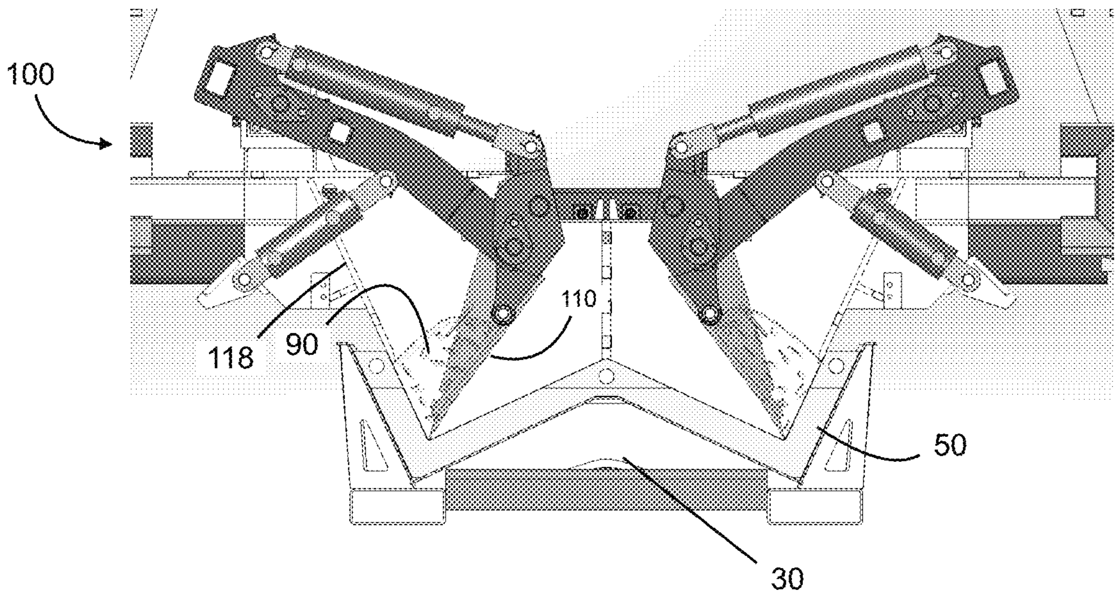

FIG. 7 shows the attacking edges 116 reaching the junctions between the first top surface 84 and the second flat top surface 94 on each side of the mold 50. Once that position is reached, the scraping courses of the shovels 110 change to follow the second top surfaces 94. Hence, the exceeding mold material 90 starts to be pushed up towards the retention plates 118.

Figure 8:
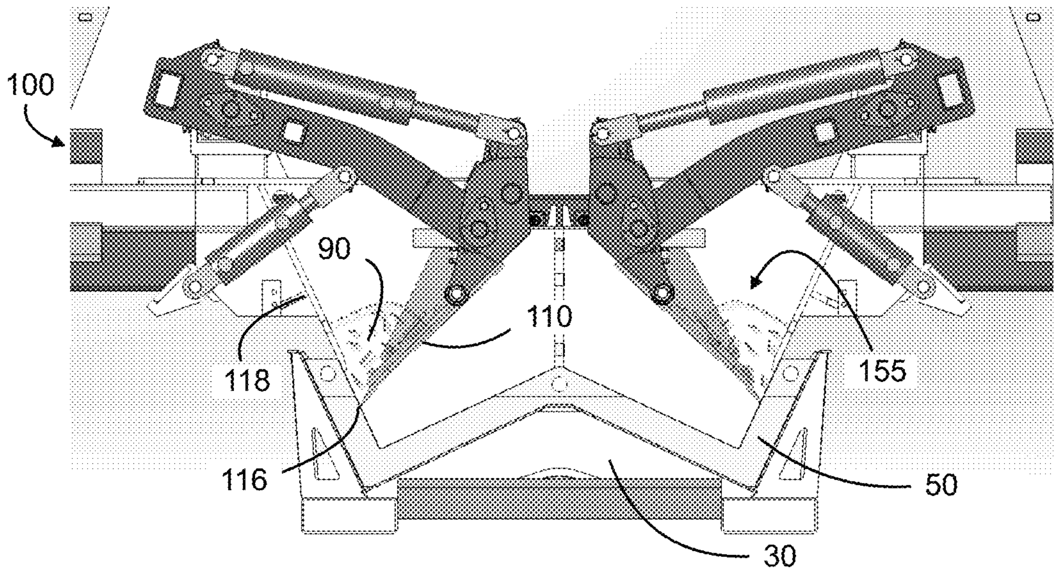

FIG. 8 shows the shovels 110 further in their scraping courses. The exceeding mold material 90 is pushed up with some already retained by the retention plates 118. The attacking edges 116 gets closer to abut against the retention plates 118, thereby closing off the space between the attacking edges 116 and the retention plates 118. Thus, the shovels 110 and the retention plates 118 approach each other to form once again reservoirs 155.

Figure 9:
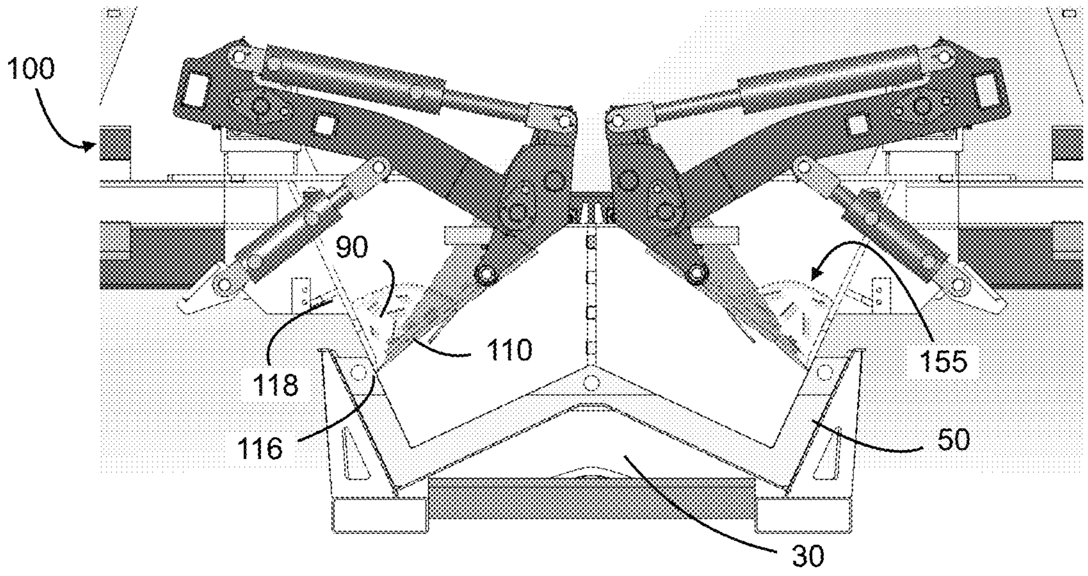

FIG. 9 shows the shovels 110 and the retention plates 118 forming reservoirs 155 with the attacking edges 116 abutting the retention plates 118. One must note that the scraping courses removed all exceeding mold material 90 from the mold 50, with the only remaining mold material 90 being located in the mold volumes 54.

Accordingly, the complementary enclosure components are further movable between a mold distant position (FIGS. 2 and 3) and a mold scraping position (FIGS. 4 to 9) to either hold and release mold material 90 onto the mold 50 or to scrape the exceeding mold material 90 from the mold 50.

The next step is illustrated through FIG. 2, with the frame 130 being raised above the mold 50. At this step, the frame 130 and the mold 50 are moved away from each other, using for example a conveyor (not shown), with the filling apparatus 100 being ready to operate in relation with a replacement empty mold 50.

It is worth noting that the filling of the filling apparatus 100 is not illustrated; the method and devices for filling such a filling apparatus 100 with mold material instead of filling a mold being well known by persons skilled in the art.

It is further worth noting that the nature and shape of the mold 50 are not limiting characteristics with respect to the filling apparatus 100. According to available embodiments, the mold 50 may take other shapes to generates round-faces corner stones 40 and alternative shaped-face corner stones 40. The shape of the back face of the corner stones 40 may further vary, with the corner stones 40 comprising extremity apexes for demolding as will be discussed later.

The mold is particularly shaped to have the face of the corner stones 40 facing downward to facilitate demolding operation as to protect the face of the corner stones from undesired contact with other operating components during the molding operation as the demolding operation.

According to an alternative embodiment (not shown), the filling apparatus may further comprise a single reservoir better adapted for molds (not shown) being free of central spine 64. Such a single-reservoir filling apparatus may be adapted to flat molds (not shown), when the flat molds 50 are for example laid in a sloped position allowing to push up exceeding mold material towards a retention plate 118.

Finally, size and shapes of side plates 132 (identified on FIGS. 3 to 5) of the shovels 110 and retention plates 118 are not specifically discussed here. The side plates 132 are for enclosing the mold material 90, preventing the mold material 90 from moving out sideways from the reservoir 155 once formed.

According to an embodiment, a conveyor system (not shown) displaces the molds along the orientation of the central spines 64 and of the outer spines 74.

Once the mold 50 being removed from under the filling apparatus 100, the mold 50 with its carrier 30 are placed on a rack for a curing period. Once the curing period is completed, the manufactured corner-stone product is ready to be demolded, or in other words removed from the mold 50.

FIGS. 10-19 show the demolding process as the demolding apparatus 200 involved.

Figure 10:
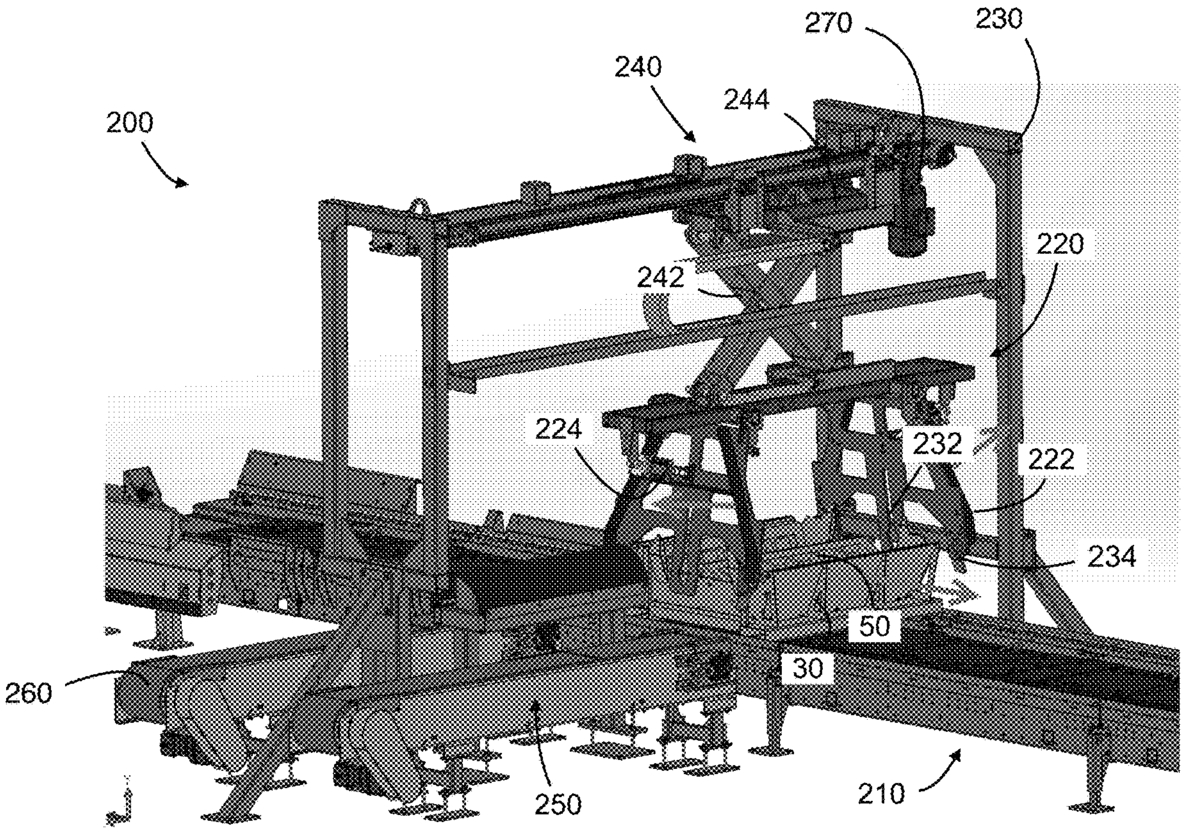
FIG. 10 is schematic diagram showing a perspective view of a demolding apparatus for demolding manufactured corner stones in accordance with an embodiment.

The perspective view of FIG. 10 shows the mold 50 and the carrier 30 moved under a handler 220 by a conveyor 210. The handler 220 comprises a frame 230. The handler 220 comprises jaws 222, moveably mounted to the frame 230 at their mounting end 223 (i.e., the jaws 222 are rotatably movable), driven by jacks 224 that are for grabbing (using their handling end 225) the mold 50 by the pins 66 and 76, and, using a moving component in the form of an overhead crane 240, for moving the mold 50 to a demolding station 250. A scissor assembly 242 located between the overhead crane 240 and the handler 220, and driven by a scissor jack 244, controls the elevation of the mold 50, lifting up and lowering the mold 50. It must be noted that, according to an alternative embodiment, the scissor assembly 242 is replaced with an alternative lifting assembly (not shown), for example an automated lifting arm, designed to handle at least vertical movement of the handler 220.

Accordingly, the demolding apparatus 200 operates according to three (3) degrees of freedom. A first degree of freedom is defined in the jaws 222 moving between a free position away from the mold 50, and a holding position contacting the mold 50. A second degree of freedom is defined in the jaws 222 moving between a lifted position distant from the bed 252 or carrier 30, and a pressing position closer to the bed 252 or carrier 30. A third degree of freedom is defined in the jaws 222 moving between a carrier position about the carrier 30 and away from the bed 252, and bed position about the bed 252 and thus away from the carrier 30. These degrees of freedom are illustrated through the sequence of operations performed throughout the demolding process as shown on FIGS. 11 to 19.

Figure 11:
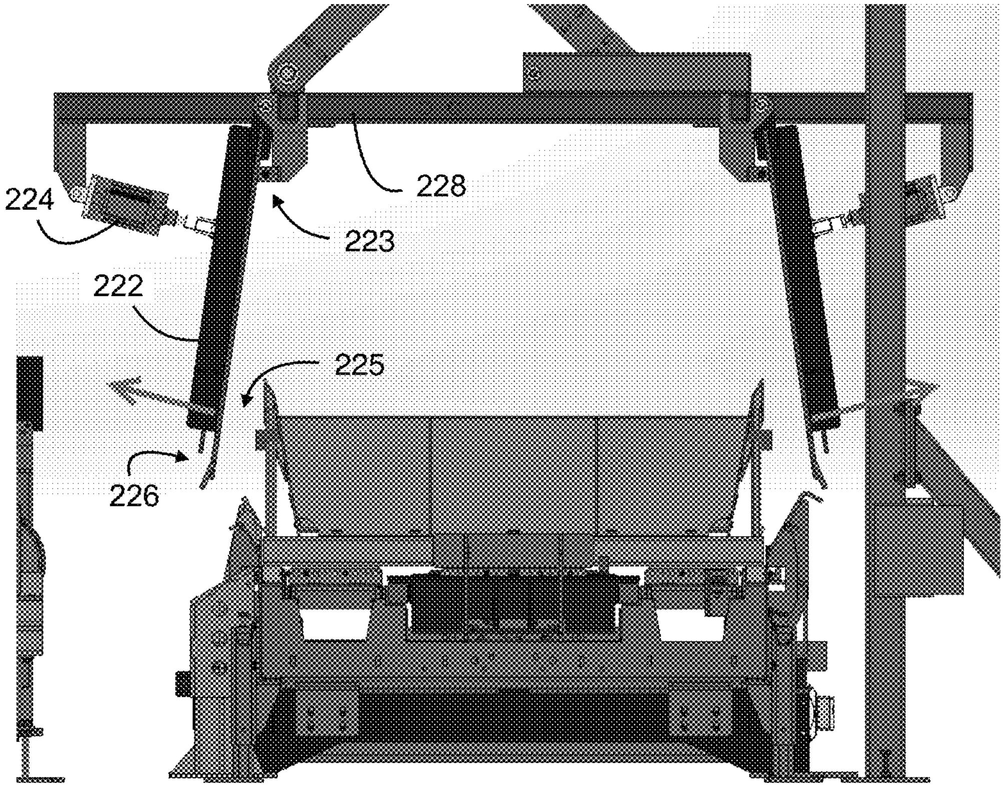
FIGS. 11-12 are schematic diagrams showing front views of the demolding apparatus of FIG. 10 at further steps of demolding manufactured corner stones in accordance with an embodiment.

FIG. 11 shows the jaws 222 moved away from the carrier 30 to free up space for the conveyor 210 to move the carrier 30 under the handler 220. A set of jacks 224 drive the positions of the jaws 222 rotatably mounted to a head structure 228. Distant from the head structure 228, the jaws 222 comprise grabbing components 226 adapted to complement structural components of the mold 50, namely the pins 66 and 76, so that the jaws 222 are able, by moving close to the carrier 30, to define a releasable secure attachment between the jaws 222 and the mold 50 for the displacement of the mold 50 by the handler 220.

Figure 12:
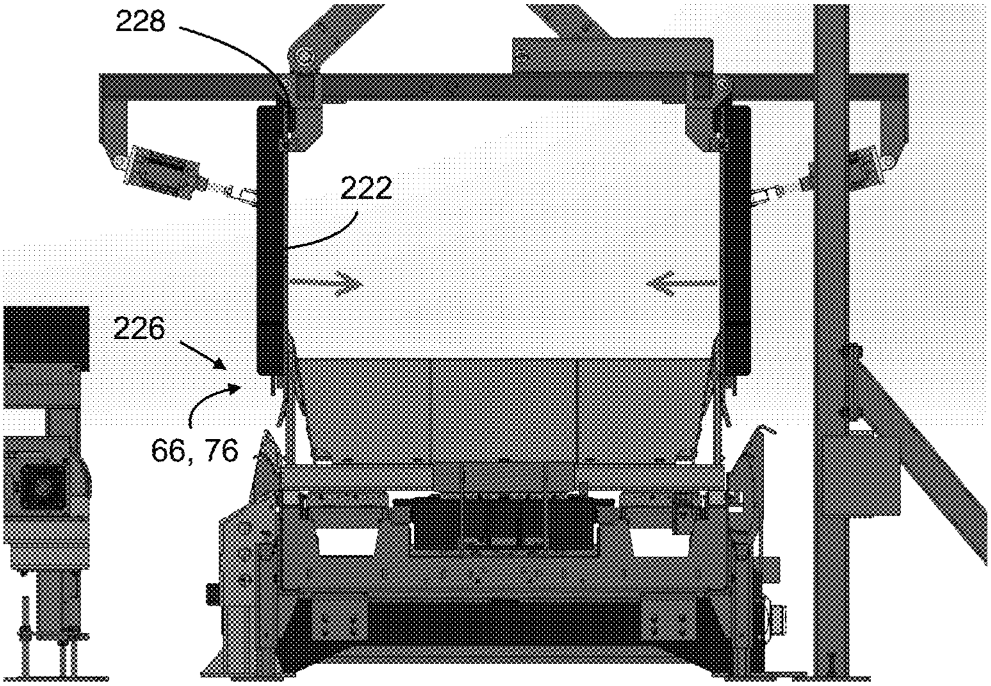
Figure 13:
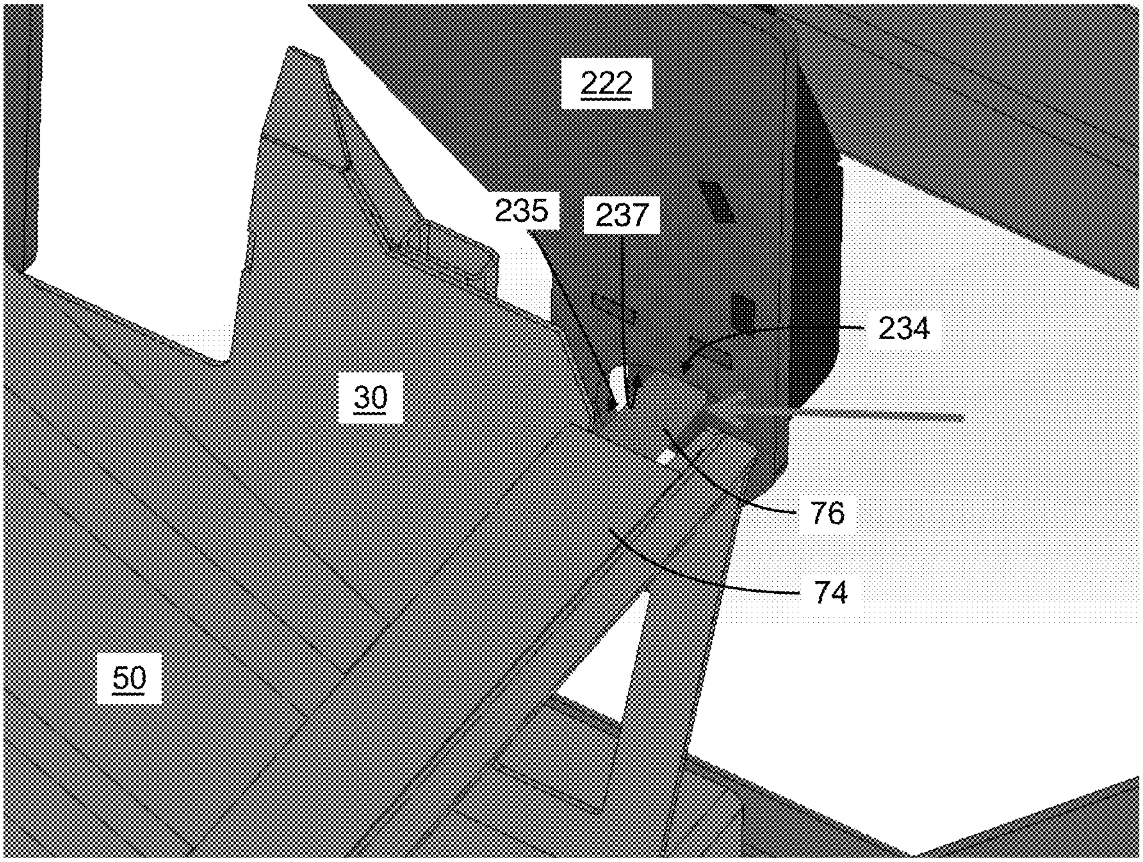
FIG. 13 is a schematic diagram showing a perspective view of a jaw grabbing an external pin of a mold at a step of demolding manufactured corner stones in accordance with an embodiment.

FIGS. 12-13 show the jaws 222 grabbing the central pins 66 and external pins 76 respectfully extending from the central spine 64 and the outer spines 74 of the mold 50.

According to an embodiment, the central pins 66 and the external pins 76 extend inwardly in the mold 50 as a single component, a rod, longer than the mold 50 and extending beyond on both sides as above discussed. The rod embodiment provides a rigid structure for the mold 50, allowing to raise the mold 50 therewith.

FIG. 13 shows a close-up view of a jaw 222 grabbing an external pin 76. The close-up view shows the side profile of the carrier 30 providing a clearance for the external pin 76 to extend beyond the exterior of the carrier 30, easing the process of the jaw 222 grabbing the external pin 76.

Furthermore, as illustrated, the term grabbing in the present context consists in the external pin 76 entering in an opening 234. One must understand that grabbing intends to cover any complementary functionality between the jaws 222 and the mold 50. Examples comprise allowing the jaws 222 to raise the mold 50 from the carrier 30 when the pin 76 contacts the bottom contacting face 235 of the opening 234. Examples further comprise forcing a downward displacement of a portion of the mold 50 when the pin 76 when the top contacting face 237 of the opening 234 contacts the pin 76.

Figure 14:
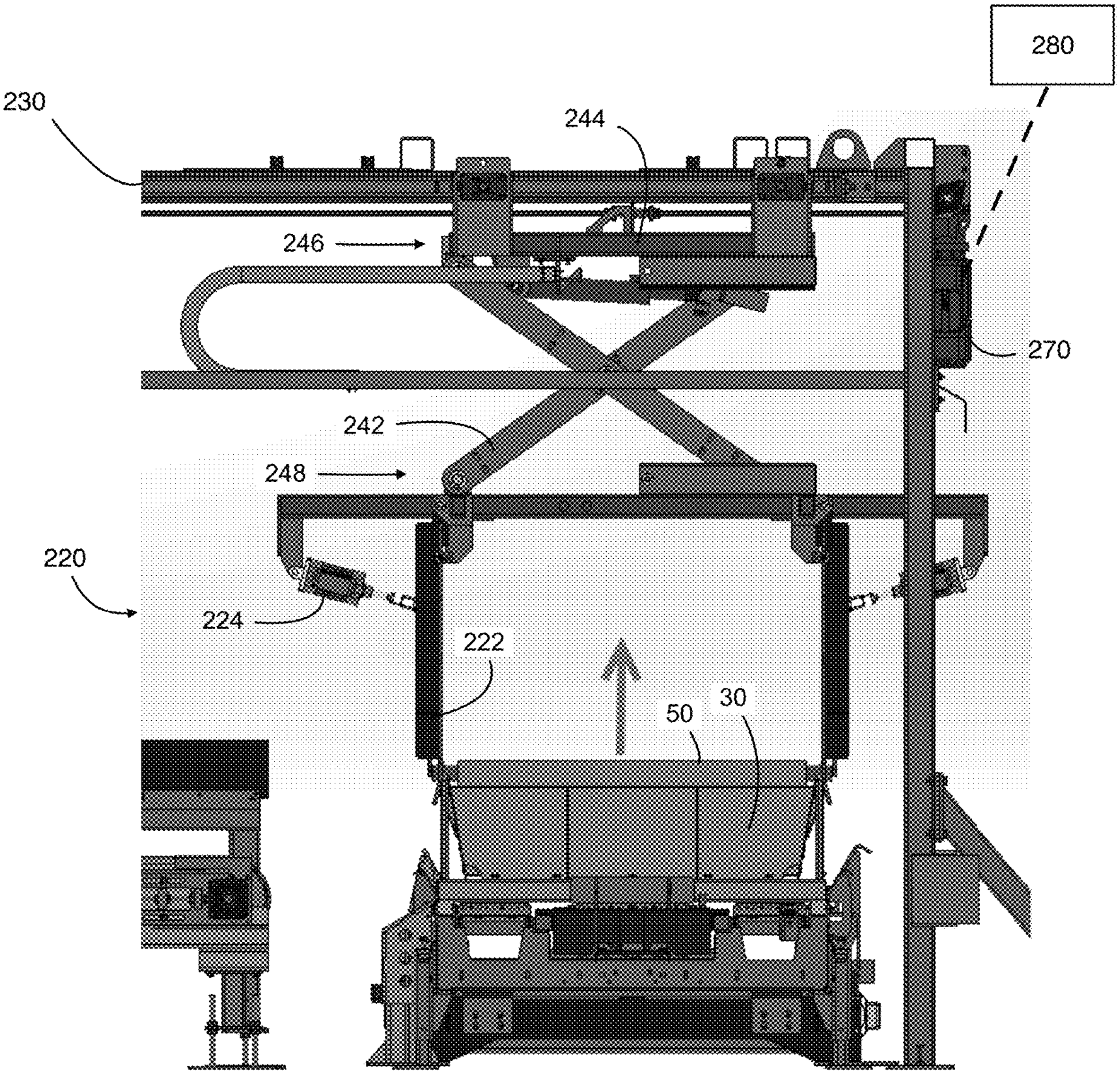
FIGS. 14-19 are schematic diagrams showing front views of the demolding apparatus of FIG. 10 at further steps of demolding manufactured corner stones in accordance with an embodiment.

FIG. 14 shows the mold 50 being lifted from the carrier 30 by the jaws 222. During this operation, the jacks 224 remains in function to ensure the cooperation between the central pins 66, the external pins 76 and the jaws 222. The scissor assembly 242 (aka a lifting assembly) operates in lifting the mold 50, the scissor jack 244 pushing away the top extremities 246 of the scissor assembly 242 and therefore forcing the bottom extremities 248 to rise, hence the jaws 222 and the mold 50.

Figure 15:
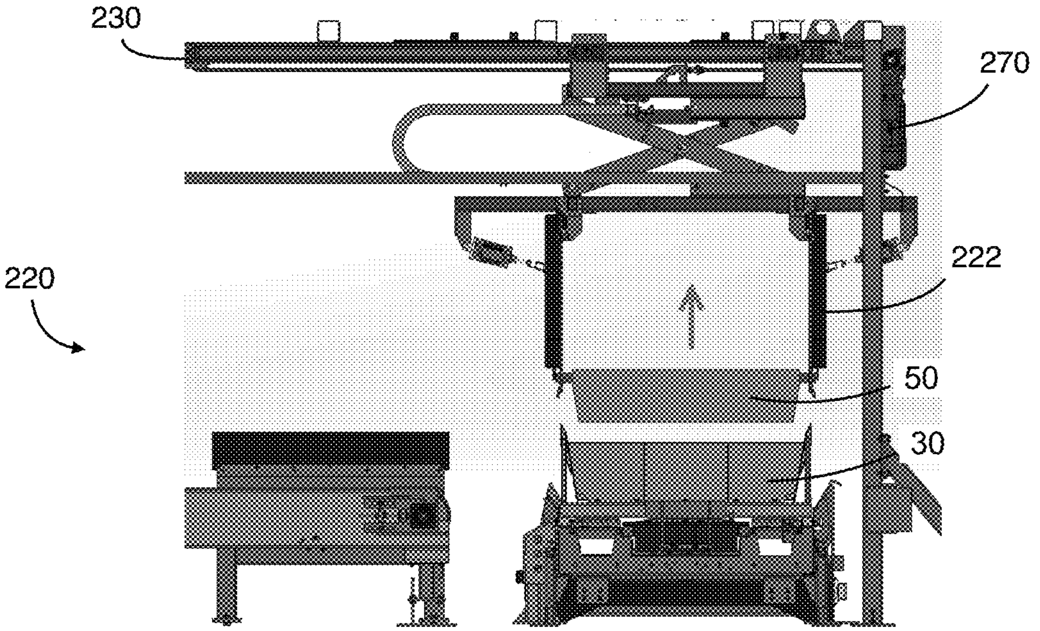

FIG. 15 shows the process of lifting the mold 50 further in time, the mold 50 being lifted above the carrier 30.

Figure 16:
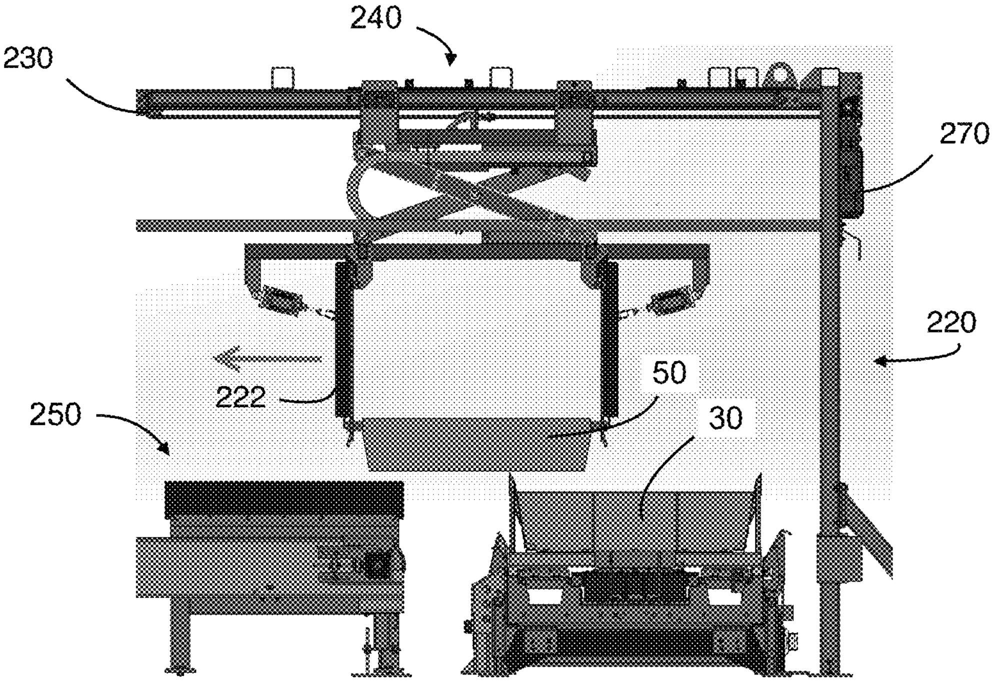

FIG. 16 shows the overhead crane 240 in action, moving the mold 50 sideway toward the demolding station 250.

Figure 17:
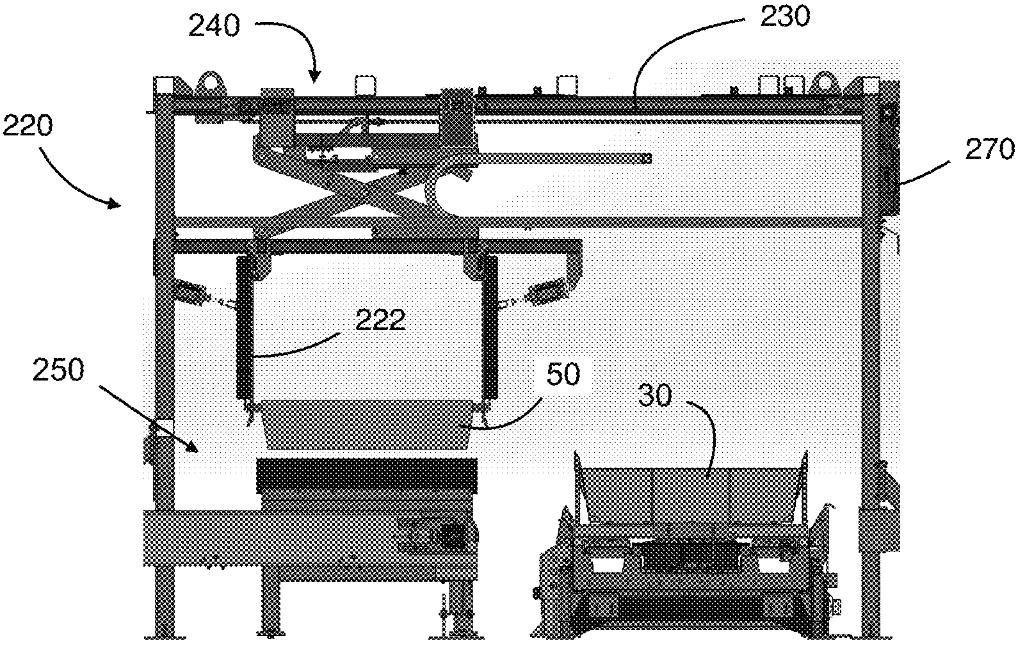

FIG. 17 shows the overhead crane 240 being moved over the demolding station 250, ready to lower the mold 50 for the demolding operation. The operation of lowering the mold 50 is driven by the scissor jack 244, which, by the pressure being released over the scissor jack 244, allows the weight of the mold 50 and the handler 220 to force the scissor assembly 242 to return to a more vertically elongated shape.

Figure 18:
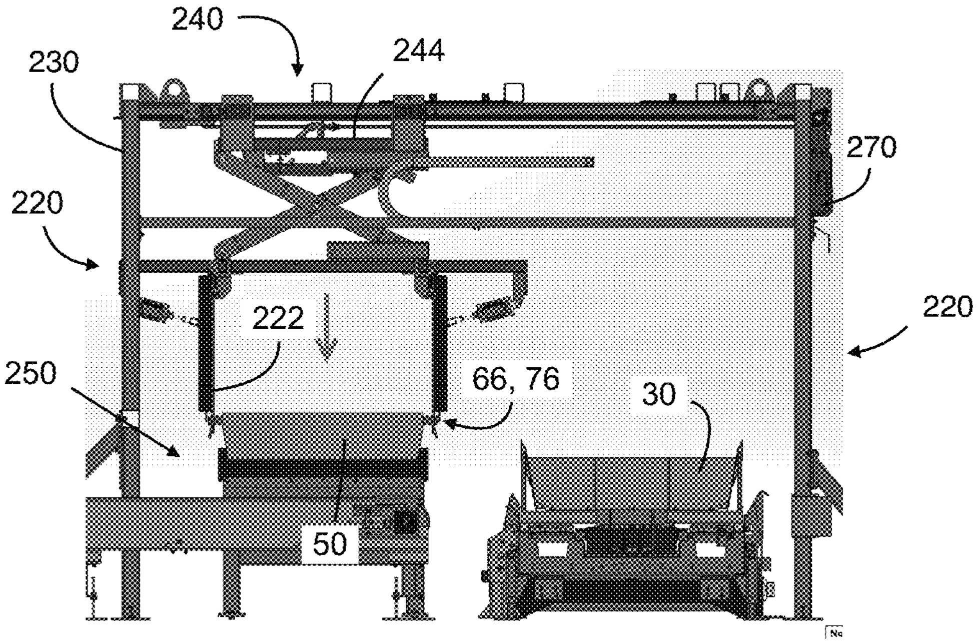

FIG. 18 shows the mold 50 being laid down over the demolding station 250, the central pins 66 and the external pins 76 remaining grabbed by the jaws 222. Not visible is the jaws 222 beginning to apply vertically-oriented pressure over the external pins 76 while not on the central pins 66 extending from the central spine 64. Back and additionally referring to FIG. 10, the jaws 222 are configured with openings 234 (FIGS. 10 and 13) of a first height for grabbing external pins 76 while openings 232 (FIG. 10) of a second height higher than the first height for grabbing the central pins 66. In the illustrated embodiment, the openings 232 of a second height take form of a slot extending upwardly from the general area of the opening 232, allowing the jaw 222 to decrease elevation relative to the central pins 66 and the external pins 76 without forcing downwardly the central pins 66. Thus, the openings 232 and 234 comprises top contacting faces and bottom contacting faces either not in contact or contacting the external pins 76 and central pins 66 in a pressing motion or a lifting motion depending on the elevation of the jaws 222 relative to the mold 50.

Figure 19:
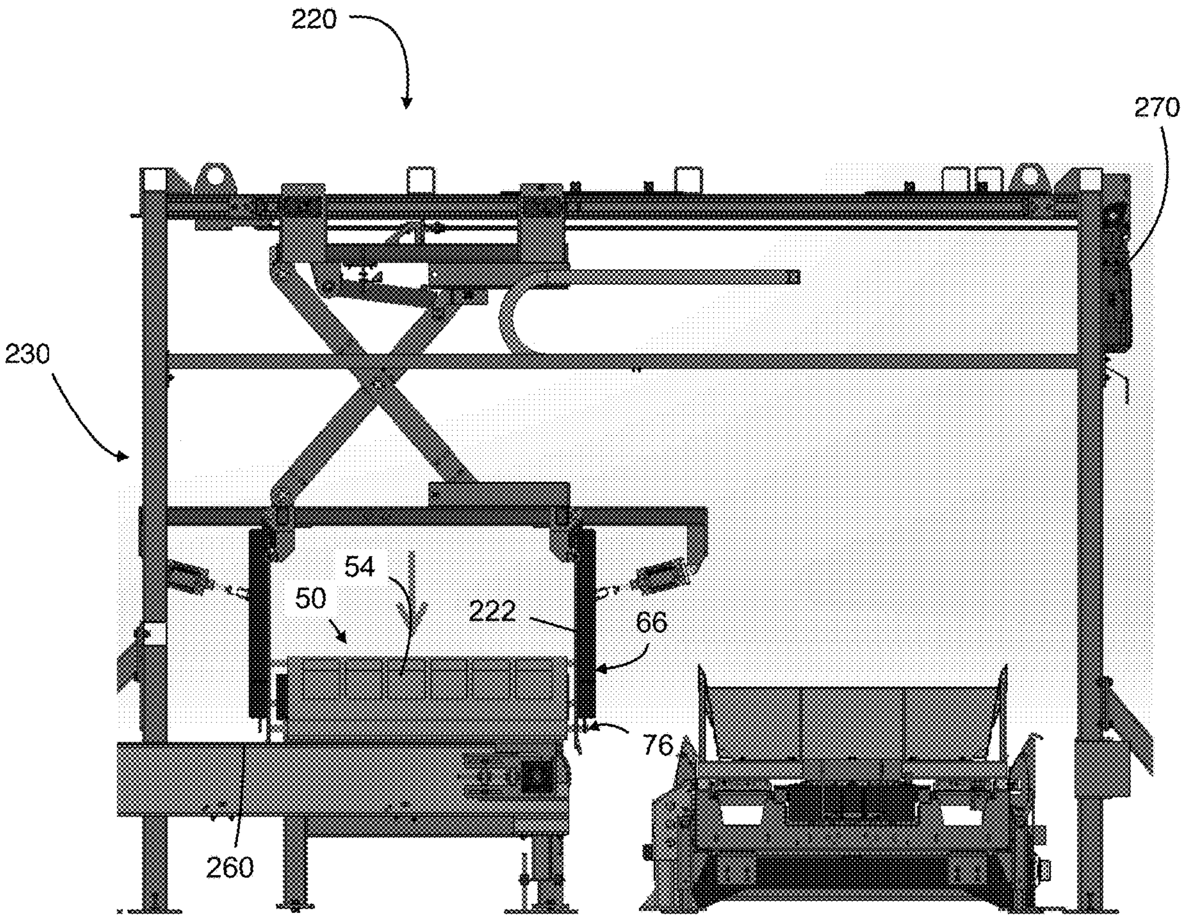
Figure 21:
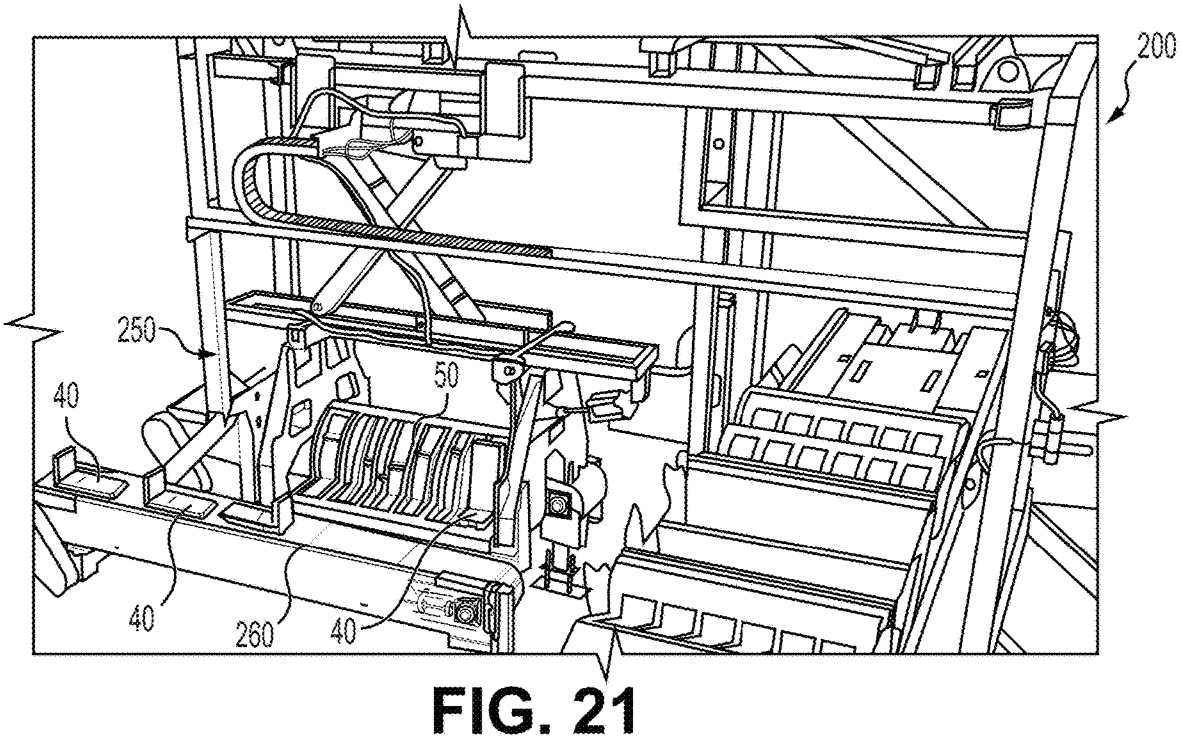
FIG. 21 is a picture showing a perspective view of the demolding apparatus with a mold having a plurality of manufactured corner stones removed and one manufactured corner stone partially demolded from the mold.

Referring to FIG. 19, the pressure applied to the external pins 76 by the jaws 222 deforms the mold 50, partially releasing the manufactured corner stones 40 from the mold volumes 54 for removing the manufactured corner stones 40 from the mold 50 by an operator (see FIG. 21 for illustration of a manufactured corner stone 40 partially demolded from the mold 50). Once removed, the manufactured corner stones 40 are placed on the conveyor 260 located in front of the mold 50. The conveyor 260 displaces the demolded manufactured corner stones 40 from the mold vicinity to another station where the manufactured corner stones 40 are to be processed furthermore, such as to a quality control station, to a stacking station, to a packaging station, etc.

According to an embodiment (not shown), an automated system is adapted to handle the manufactured corner stones 40 from the moment they are partially removed from the mold 50 to further processing of the manufactured corner stones 40. Embodiments comprise use of brushes or pneumatic plungers as aids in removing the manufactured corner stones 40 from the mold 50. According to an embodiment, the automated system is further adapted to inspect the mold 50 once the manufactured corner stones 40 are removed and/or to operate maintenance operations (brushing, cleaning, applying compound, etc.) over the empty mold 50.

FIG. 19 shows a single side of the demolding station 250, hence of the mold 50 with the conveyor 260 disposed in front. One must note that the mold 50 is substantially symmetrical relative to the central spine 64. Hence the demolding station 250 is designed similarly, with the hidden part featuring a similar conveyor 260 (see also FIG. 20).

Figure 20:
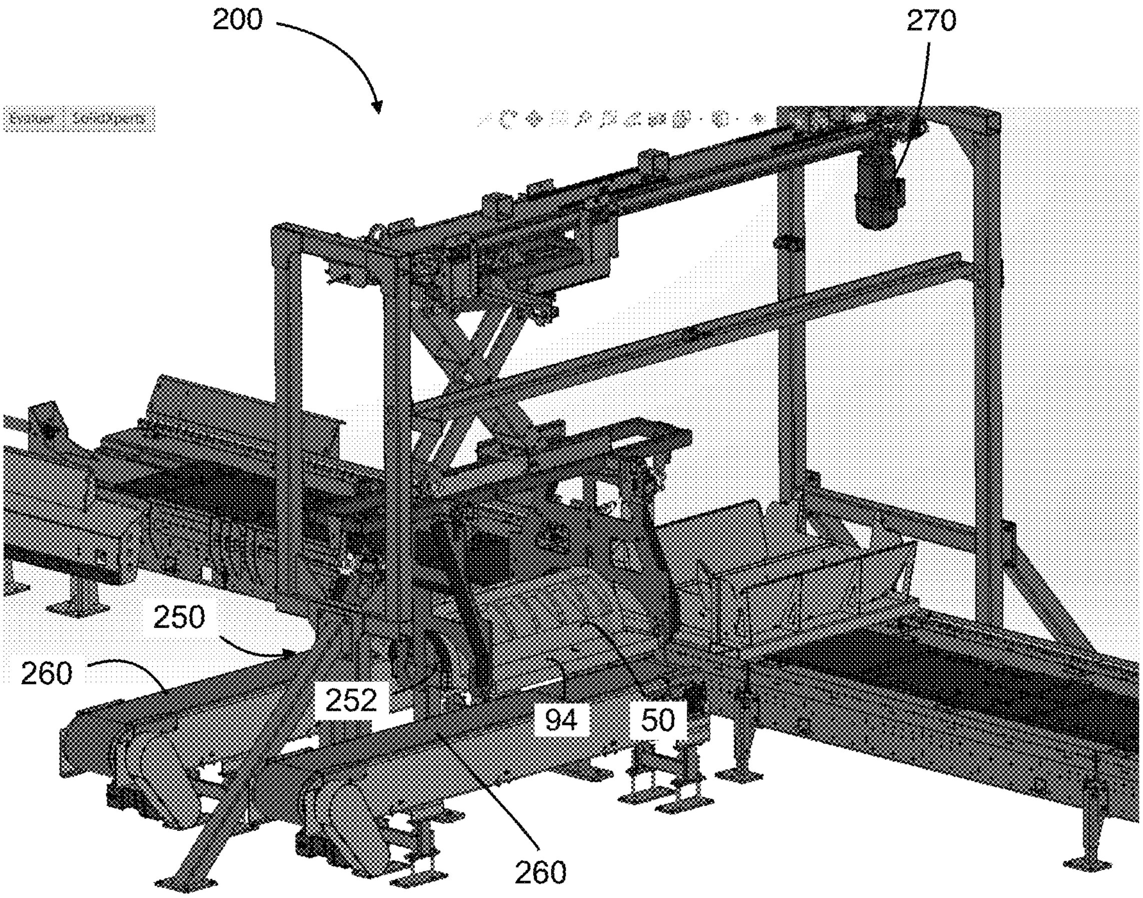
FIG. 20 is schematic diagram showing a perspective view of the demolding apparatus of FIG. 10 at a further step of demolding manufactured corner stones in accordance with an embodiment.
Figure 22:
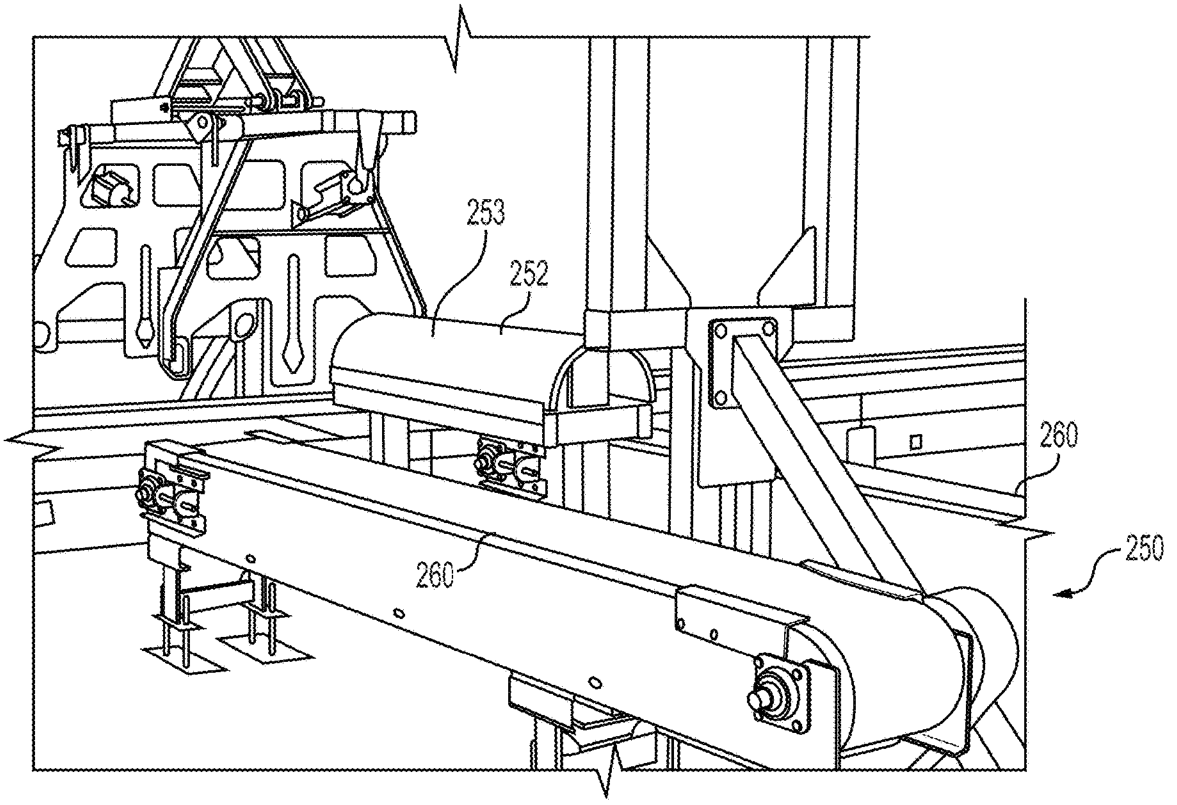
FIG. 22 is a picture showing a perspective view of the demolding apparatus, and more particularly showing the shape of the bed of the demolding station according to an embodiment.

FIG. 20 shows a perspective view of the demolding station 250, with the mold 50 in the deformed state. FIG. 20 shows the shape of the bed 252 on which is laid down the mold 50 when lowered at the demolding station 250. The shape of the bed face 253 (FIG. 22) of the bed 252 is of a symmetrical arched bed 252 (i.e., at least a portion of the bed shape comprises a convex shape, see FIG. 22) wherein, when no pressure is applied on the mold 50, the junctions of respective first sloped bodies 62 and second sloped bodies 72 remain floating in the air. Upon deformation under pressure over the external pins 76, the first sloped bodies 62 adopt the shape of the bed 252, easing the release of the manufactured corner stone 40 from the mold volumes 54.

In order to set relative coordinates, the bed 252 comprises a bed face 253 having a longitudinal direction parallel to the longitudinal direction of the mold 50 to be laid thereon. The bed face 253 has a bed shape, illustrated as a symmetrical arched bed shape, according to the transversal orientation. When a mold is laid down on the bed 252, the resting faces 86, 96 of the mold 50 rests freely over the bed 252 with free space remains between at least part of the resting faces 86, 96 of the mold 50 and the bed face 253 about at least one of the longitudinal outer spines 64, 74 of the mold 50.

In relation with the relative coordinates of the mold 50, the mold 50 comprises side by side mold volumes 54 in the longitudinal direction parallel to the central spine 64, the outer spines 74 and the pins 66 and 76. The outer spines 64 and 74 are thus transversally distant from each other.

The herein described deformation of the mold 50 in order to partially release the manufactured corner stones 40 from the mold 50 has significantly decreased the number of defects on manufactured corner stones 40 over the methods of the prior art. The shape of the bed 252 and the controlled speed at which the mold 50 is forcibly deformed result in a gradual demolding of the manufactured corner stones 40 from the mold 50, which results in significantly decreasing the costs of manufacturing corner stones 40 and the amount of lost material. Thus, according to embodiments and design specifications of the mold 50 (material, configuration, number of mold volumes 54 per mold 50, etc.) and the corner stones 40 (shape, dimensions, molding material, etc.), the deformation speed is set to match a particular value or curve over the demolding processes, the value or curve being set based on testing.

Now returning to the figures, FIG. 20 further shows the second top surfaces 94 which are substantially horizontal and co-planar, which is a configuration that is an indication on how easy it is to demold the manufactured corner stones 40 in that position than when the mold 50 features no deformation.

Once the mold 50 is clean, i.e., the manufactured corner stones 40 removed therefrom, and cleaned from residues of mold material 90, the mold 50 is ready to be removed from the demolding station 250. The removing of the mold 50 includes the steps of lifting the mold 50, moving the mold 50 laterally so that the mold 50 resides above the carrier 30, lowering the mold 50 to lay down the mold 50 on the carrier 30, and releasing the mold 50 from the jaws 222. These steps may be illustrated through FIGS. 10-19 in the opposite order. Once the clean mold 50 is laid down back on the carrier 30, the conveyor 210 displaces the carrier 30 away from the handler 220, and simultaneously displaces a replacement mold 50 containing manufactured corner stones 40 under the handler 220.

One must understand from the present disclosure that the different driving components (e.g., jacks, and more precisely hydraulic jacks) are operated according to power engine 270 and controls 280 (see FIGS. 10-19, and particularly FIG. 14) which are schematically illustrated and that can take a variety of form in different realizations. For instance, according to an embodiment, the power engine 270 comprises an electric motor powering a hydraulic pump powering hydraulic jacks. According to an embodiment, the controls are manual controls. According to another embodiment, the controls comprise automated controls synchronizing actions of driving components according to a readable program. According to another embodiment, sensors are located to monitor operations performed by the driving components, with the sensors transmitting signals to the controls or controller resulting in overriding controls when critical conditions are detected by the sensors.

Accordingly, even though the above embodiments have been described without specific reference to the control aspect, one must understand that a variety of control configurations are available, involving manual controls, processors, sensors and/or others not herein described components that are well known to a person skilled in the art of automation.

According to an embodiment, the mold 50 consists in a deformable mold 50 for manufacturing corner stones 40 having at least a first spine 64 and a second spine 74. Each one of the first spine 64 and the second spine 74 offers a longitudinal rigidity to the mold 50. Each one of the first spine 64 and the second spine 74 further feature handling components (e.g. first pins 66 and second pins 76) capable of receiving pressure to distance the first spine 64 and the second spine 74 from each other, hence to deform the mold 50 to ease removal of the manufactured corner stones 40 from the mold 50.

According to an embodiment, the first pins 66 and/or the second pins 76 comprise notches (not shown) to prevent the first pins 66 and/or the second pins 76 to slide when grabbed by the jaws 222. According to the embodiment, the notches are located on the lower side of the first pins 66 and/or the second pins 76. According to an embodiment, the first pins 66 and/or the second pins 76 feature abutment components (not shown) defining a shoulder beyond the location wherein the jaws 222 grab the first pins 66 and/or the second pins 76.

Figure 24:
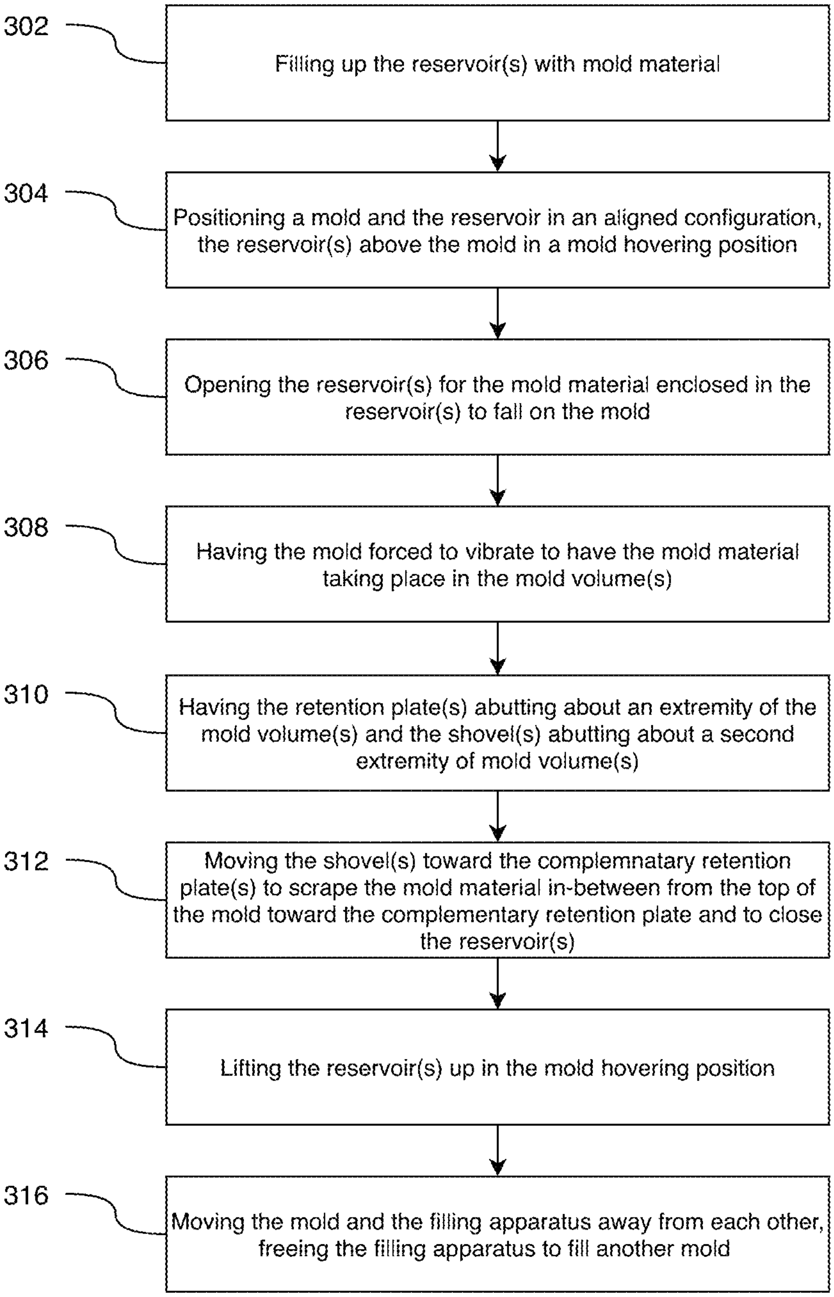
FIG. 24 is a flow chart illustrating steps of a method of filling a mold with mold material in accordance with an embodiment.

Referring now to FIG. 24. According to an embodiment, a method of filling a mold with mold material comprises the following steps.

At step 302, the method comprises filling up the reservoir(s) of a filling apparatus with mold material.

At step 304, the method further comprising positioning a mold comprising an apex and the reservoir(s) in an aligned configuration, the reservoir(s) of the filling apparatus being located above the mold in a mold filling position. According to an embodiment, the mold consists in a V-shaped mold comprising a mold volume below a mold top face. The V-shaped mold therefore comprises a back comprising two sections generating together the V shape, a front comprising the mold top face, and the mold volume(s) in-between wherein mold material defining an enclosure for mold material to cure to manufacture a molded product.

At step 306, the method further comprises opening the reservoir(s) of the filling apparatus. Upon its opening, the mold material held in the reservoir(s) is released from the reservoir(s) and falls on the mold.

At step 308, the method (optionally) comprises having the mold forced to vibrate to have the mold material take place in the mold volume(s) of the mold.

At step 310, the method comprises lowering the retention plate and the shovel to the mold scraping position. Accordingly, the method comprises having a retention plate part of the filling apparatus abutting about extremity of mold volume(s) and a shovel part of the filling apparatus abutting about a second extremity of mold volume(s).

At step 312, the method comprises moving at least one of the retention plate and the shovel toward the other so as to scrape the mold material in-between from the top of the mold toward the other. When the retention plate and the shovel are in contact, they form a reservoir holding the exceeding mold material scraped from the top of the mold.

At step 314, the method comprises lifting the reservoir(s) up in a mold filling position.

At step 316, the method comprises moving the mold and the filling apparatus away from each other, freeing the filling apparatus to fill another mold with mold material.

Figure 25:
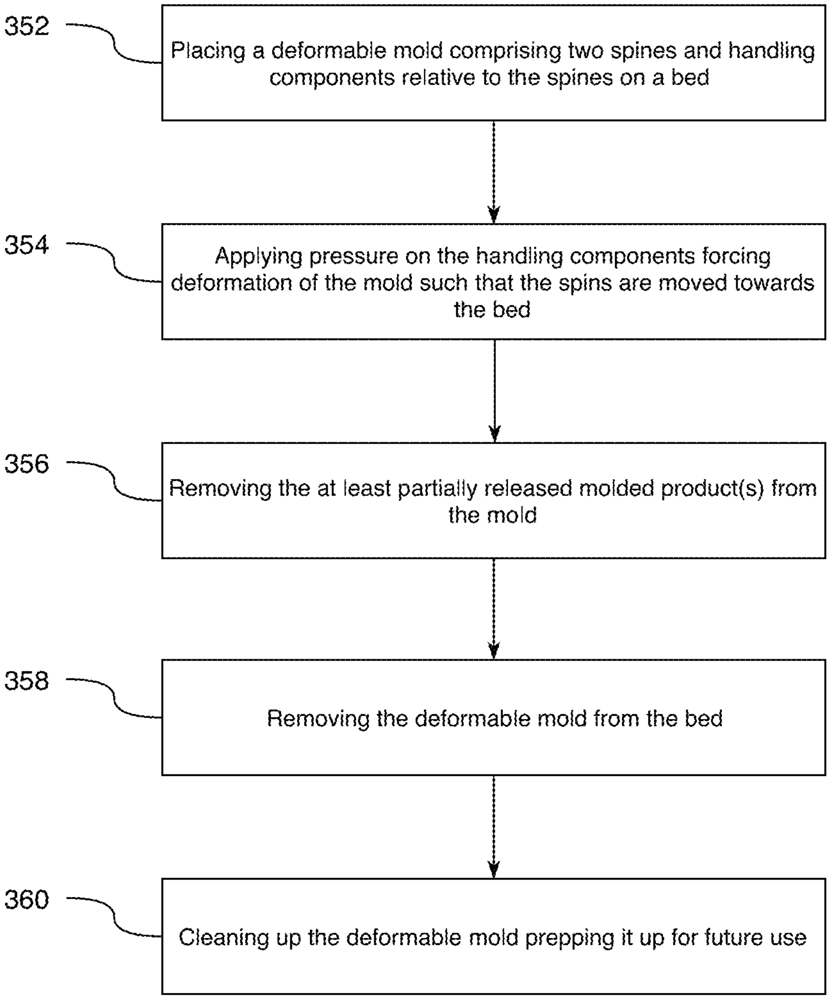
FIG. 25 is a flow chart illustrating steps of a method of demolding manufactured corner stones from a deformable mold in accordance with an embodiment.

Referring now to FIG. 25. According to an embodiment, a method of demolding manufactured corner stones from a deformable mold comprises the following steps.

At step 352, the method comprises placing the V-shaped deformable mold comprising two outer spines and handling components relative to the spines on a bed wherein at least part of the deformable mold is not supported by the bed. According to an embodiment, the mold holds one or more molded manufactured corner stones. According to embodiments, the molded product consists in another type of molded product, wherein the molded product is molded using one of a V-shaped mold, a U-shape mold or another shape of deformable mold comprising a resting face having a convex shape. According to other embodiments, the mold has a different shape of a resting face, with the bed shape and the mold shape complementing each other in a functional manner as described herein.

At step 354, the method comprises applying pressure on the handling components, the pressure forcing deformation of the deformable mold such that the outer spines are moved towards the bed, and thereby at least partially releasing the manufactured corner stone from the mold.

At step 356, the method comprises removing the at least partially released manufactured corner stone(s) from the mold.

At step 358, the method comprises removing the deformable mold from the bed.

At step 360, the method comprises cleaning up the deformable mold prepping it up for future use.

It is worth noting that, according to embodiments, steps 356 to 360 may be performed manually or using an automated device without departing from the present method.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A demolding apparatus for demolding a product from a deformable mold having two rigid spines, a longitudinal mold volume extending transversally to the two spines wherein the mold volume has an upward opening, and a resting face opposed to the opening of the mold volume, the demolding apparatus comprising:

a bed having a shape resulting in, when the resting face of the deformable mold rests on the bed without exterior force applied thereon, having clearance about at least one of the spines between the resting face and the bed; and jaws configured, when a movement is imparted to bring the deformable mold and the bed in contact with each other, to apply pressure over the spines of the deformable mold moving the rigid spines towards the bed and thereby forcing the resting face of the deformable mold to temporarily adopt at least partially the shape of the bed, and thereby at least partially releasing the product from the mold volume.

2. The demolding apparatus of claim 1, wherein the deformable mold comprises a body, wherein the spines extend beyond the body into pins, and wherein the jaws interface with the pins.

3. The demolding apparatus of claim 2, wherein the spines extend in a longitudinal spine direction, wherein the jaws are moveable between a first position distant to the deformable mold along the longitudinal spine direction and a second position wherein the jaws interface with the pins.

4. The demolding apparatus of claim 2, wherein the jaws comprise openings for the pins to enter therein when the jaws interface with the deformable mold.

5. The demolding apparatus of claim 1, further comprising a lifting assembly extending from a frame, wherein the jaws are mounted to the frame, and wherein the lifting assembly is configured for imparting vertical movement to the deformable mold.

6. The demolding apparatus of claim 5, wherein the jaws are mounted to a moving means allowing the lift assembly to impart horizontal movement to the deformable mold.

7. The demolding apparatus of claim 5, further comprising a head structure mounted to the frame, the head structure being movable horizontally, and the lifting assembly mounted to the head structure, the lifting assembly being movable vertically.

8. A demolding kit comprising:

a deformable mold having two rigid spines, a longitudinal mold volume extending transversally to the spines for molding a product wherein the mold volume has an upward opening, and a resting face opposed to the opening of the mold volume; and a bed having a non-matching shape relative to the resting face of the deformable mold, wherein clearance between the resting face and the bed about at least one of the spines is present when the resting face of the mold rests on the bed without exterior force applied thereon, and wherein the deformable mold is configured to have the resting face at least partially adopting the shape of the bed when exterior face is applied on the spines to move the rigid spines towards the bed thereby forcing the resting face of the deformable mold to temporarily adopt at least partially the shape of the bed, and thereby at least partially releasing the product from the mold volume.

9. The demolding kit of claim 8, further comprising means for imparting movement to bring the deformable mold and the bed in contact, and to apply pressure over the spines of the deformable mold forcing the resting face of the deformable mold to temporarily adopt the shape of the bed thereby at least partially releasing the product from the mold volume.

10. The demolding kit of claim 9, wherein the imparting means comprises jaws interfacing with the spines.

11. The demolding kit of claim 10, wherein the deformable mold comprises a body, the spines extending beyond the body into first pins, and wherein the jaws interface with the first pins.

12. The demolding kit of claim 11, wherein the spines extend in a longitudinal spine direction, wherein the jaws are moveable between a first position distant to the mold along the longitudinal spine direction, and a second position wherein the jaws interface with the first pins.

13. The demolding kit of claim 11, wherein the jaws comprise first openings for the first pins to enter therein when the jaws interface with the deformable mold.

14. The demolding kit of claim 11, wherein the two spines are a first outer spine and a second outer spine, wherein the deformable mold further comprises a central spine, the deformable mold comprising a first mold volume extending transversally between the first outer spine and the central spine, and a second mold volume extending transversally between the central spine and the second outer spine.

15. The demolding kit of claim 14, wherein the first mold volume and the second mold volume have a first sloped body and a second sloped body that are non-planar to each other.

16. The demolding kit of claim 14, wherein the resting face has a W-shape.

17. The demolding kit of claim 14, wherein the central spine extends into second pins, the jaws comprise first openings for the first pins to enter therein, second openings for the second pins to enter therein, wherein the second openings extend over a smaller height than the first openings.

18. The demolding kit of claim 10, further comprising a lifting assembly extending from a frame, wherein the jaws are mounted to the frame, and wherein the lifting assembly is configured for imparting vertical movement to the deformable mold.

19. The demolding kit of claim 18, wherein the jaws are mounted to a moving means allowing the lift assembly to impart horizontal movement to the deformable mold.

20. The demolding kit of claim 18, further comprising a head structure mounted to the frame, the head structure being movable horizontally, and the lifting assembly mounted to the head structure, the lifting assembly being movable vertically.

* * * * *